(12) United States Patent
Prutkin et al.

(10) Patent No.: US 6,648,159 B2
(45) Date of Patent: *Nov. 18, 2003

(54) COLLAPSIBLE THREE-DIMENSIONAL ENCLOSURE, AND A METHOD OF MANUFACTURING THEREOF

(76) Inventors: Vladimir Prutkin, 477 34th Ave., #12, San Francisco, CA (US) 94121; Oskar Kalman, 956 E. San Carlos Ave., San Carlos, CA (US) 94070

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/789,491

(22) Filed: Jan. 27, 1997

(65) Prior Publication Data

US 2003/0168452 A1 Sep. 11, 2003

Related U.S. Application Data

(63) Continuation-in-part of application No. 08/531,325, filed on Sep. 20, 1995, now abandoned.

(51) Int. Cl.[7] .............................. B65D 6/18; B65D 6/22; B65D 25/00
(52) U.S. Cl. ............................ 220/4.28; 220/6; 220/62; 220/626; 220/691
(58) Field of Search ................. 220/7, 6, 4.28, 220/62, 62.11, 691, 690, 682, DIG. 25, 4.21, 9.1, 9.2, 9.3, 9.4

(56) References Cited

U.S. PATENT DOCUMENTS

| | | | | |
|---|---|---|---|---|
| 3,281,049 A | * | 10/1966 | Avitable et al. | 229/122 |
| 4,235,346 A | * | 11/1980 | Liggett | 220/7 |
| 5,501,758 A | * | 3/1996 | Nitardy | 156/198 |
| 5,555,989 A | * | 9/1996 | Moran, Jr. | 220/4.28 |

* cited by examiner

Primary Examiner—Lee Young
Assistant Examiner—Niki M. Eloshway
(74) Attorney, Agent, or Firm—Irya Zborovsky

(57) ABSTRACT

A collapsible, reusable, general purpose shipping box is made from an inexpensive polymer composition, and can be mass produced by extrusion or coextrusion. The boxes are extruded or coextruded in an almost wasteless production as endless webs of inner layouts and outer layouts, which are folded into respective configurations with one of the configurations being outer one and another inner one. The enclosure is assembled by inserting the inner configuration into the outer one and snap-connecting the complementary male-female locking elements already extruded into the layouts. An extruded web may be many layouts wide as a given extruder and die allow. The boxes can be easily assembled from substantially flat and rectangular layouts at the point of packaging, either by hand or by using a slightly modified and currently widely used box erection machine, and as easily disassembled for transportation and cleansing at the point of unloading.

7 Claims, 20 Drawing Sheets

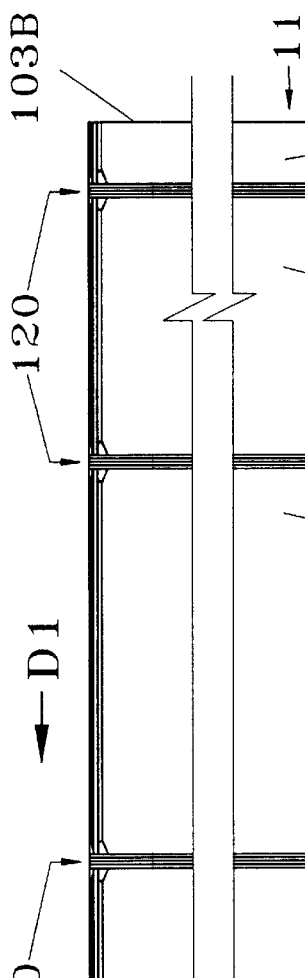
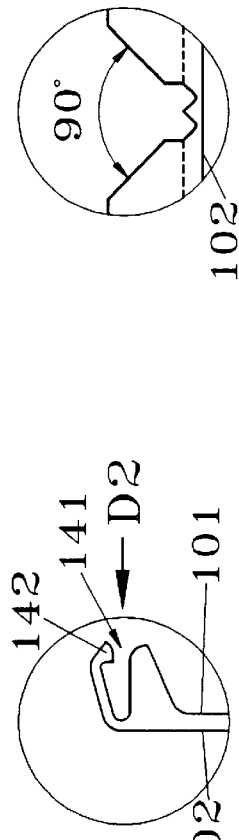
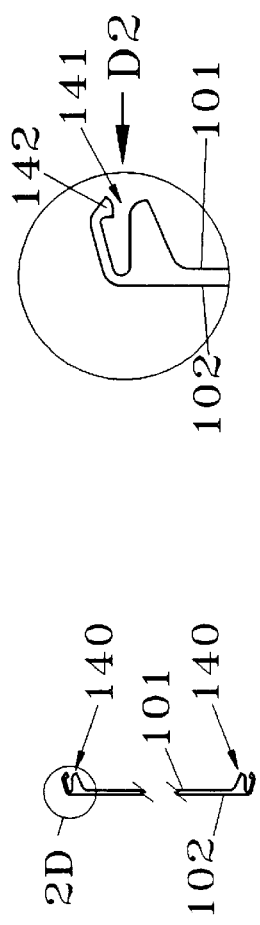
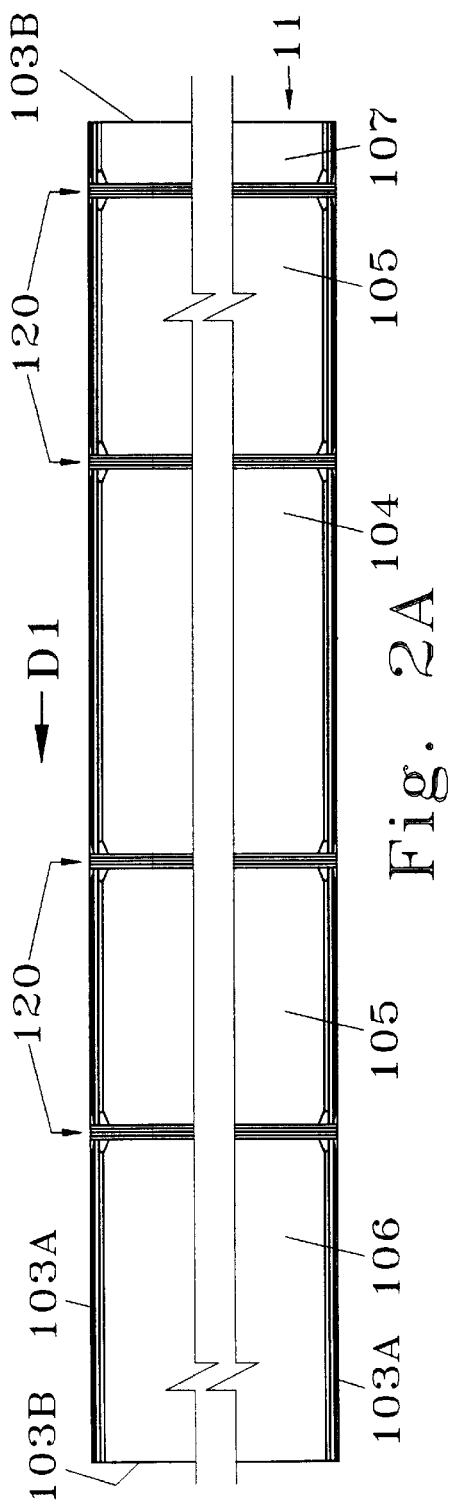
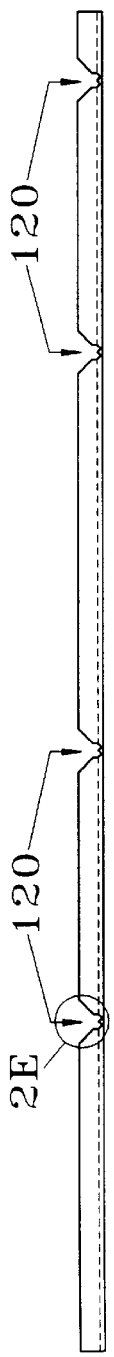

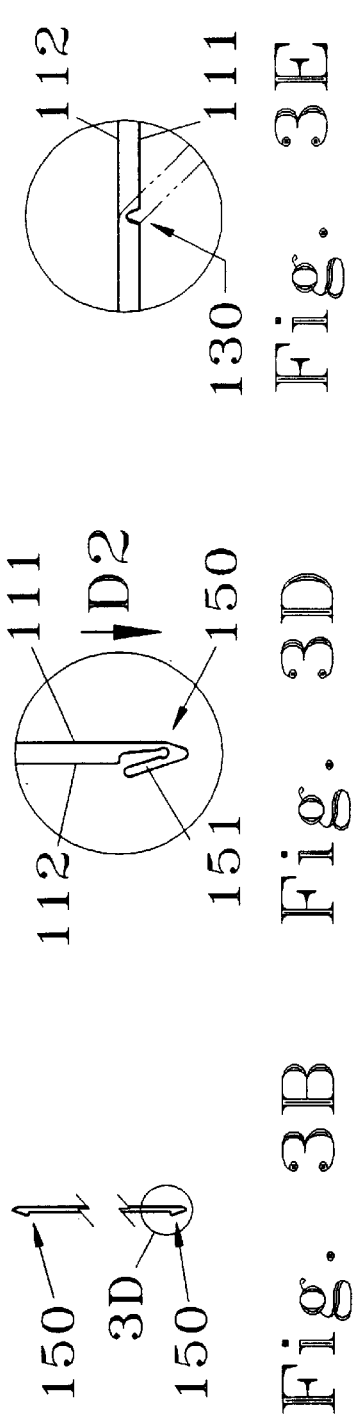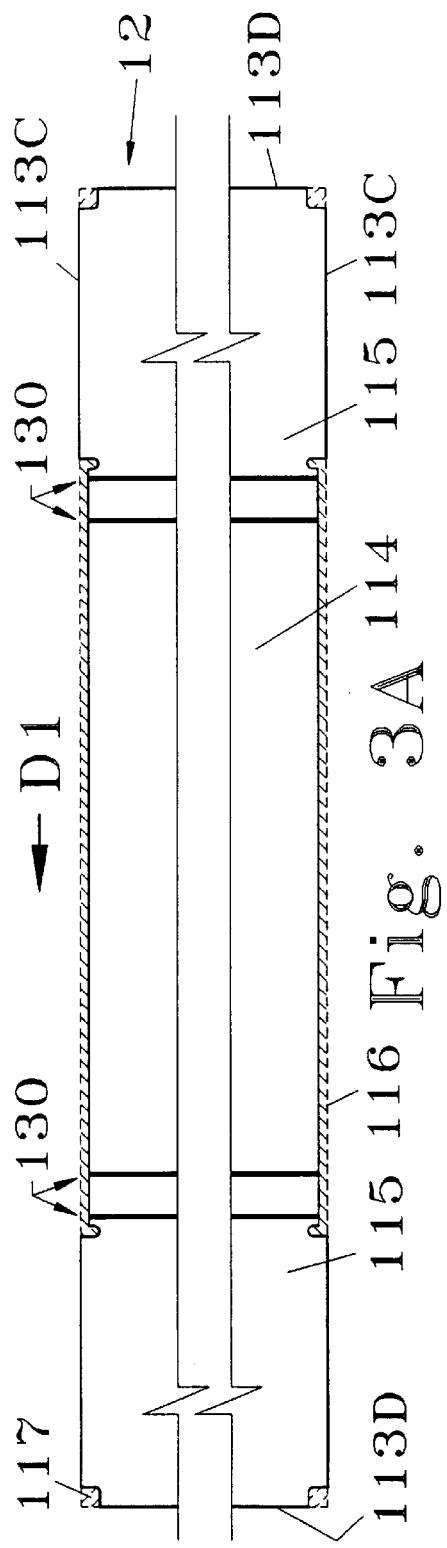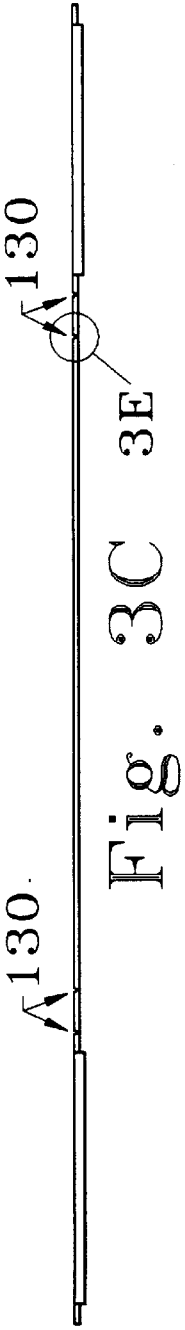

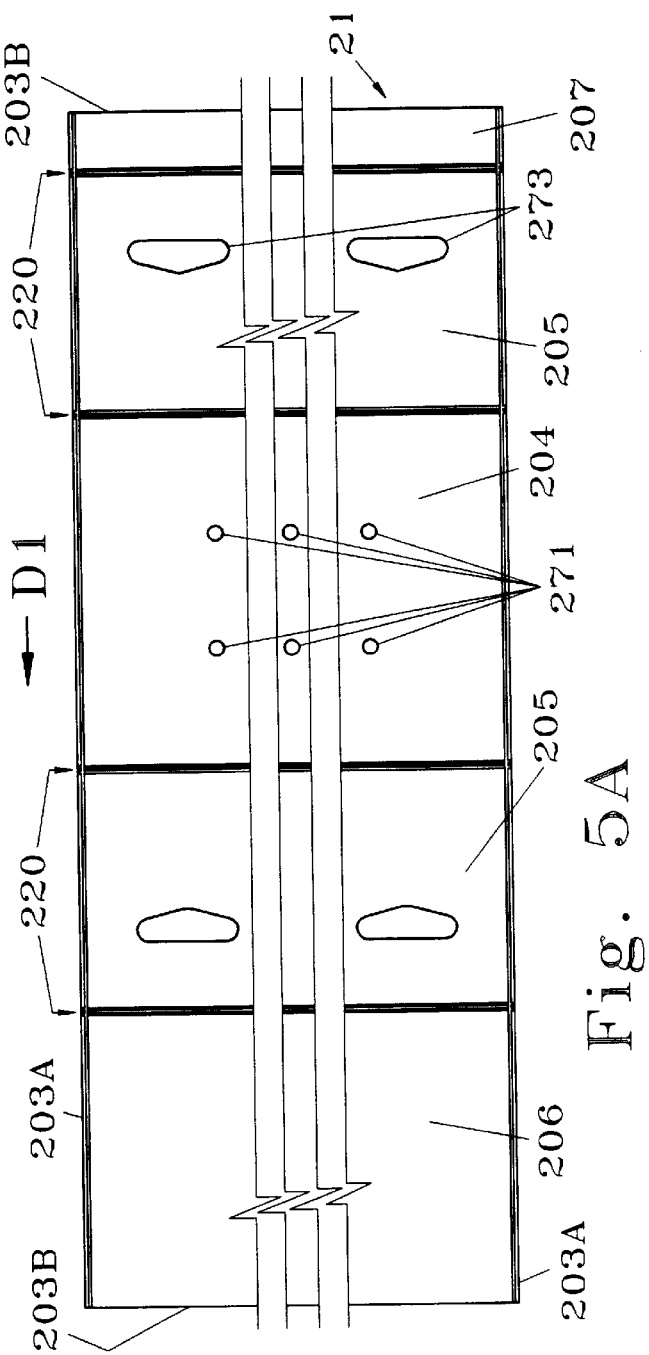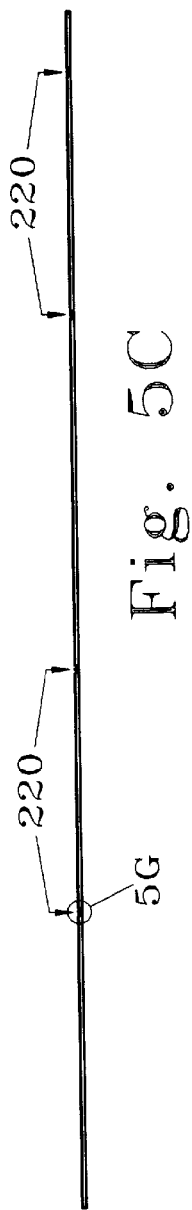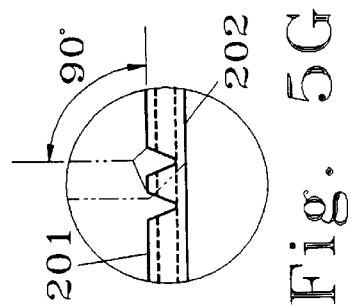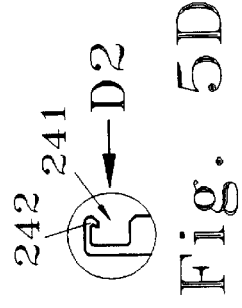

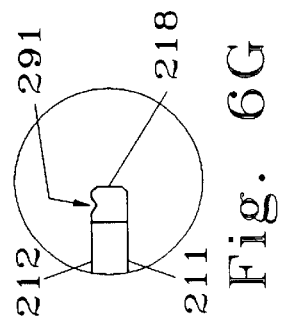
Fig. 6G
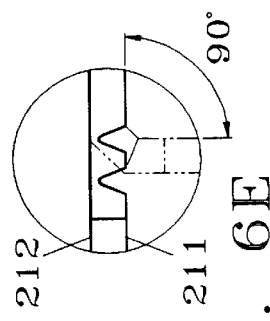
Fig. 6E
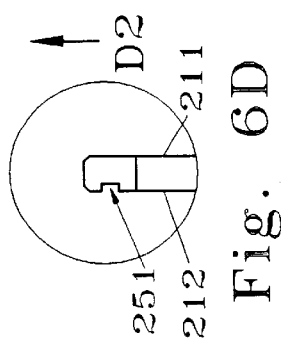
Fig. 6D
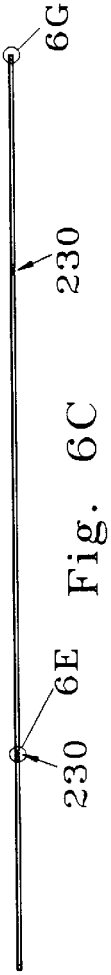
Fig. 6C
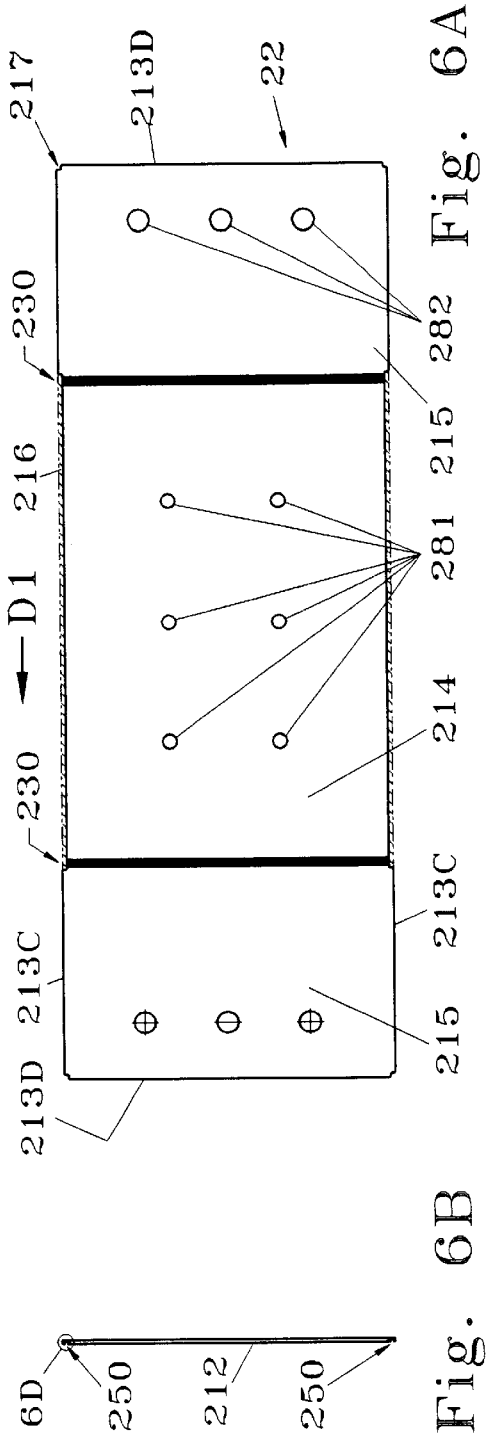
Fig. 6A
Fig. 6B

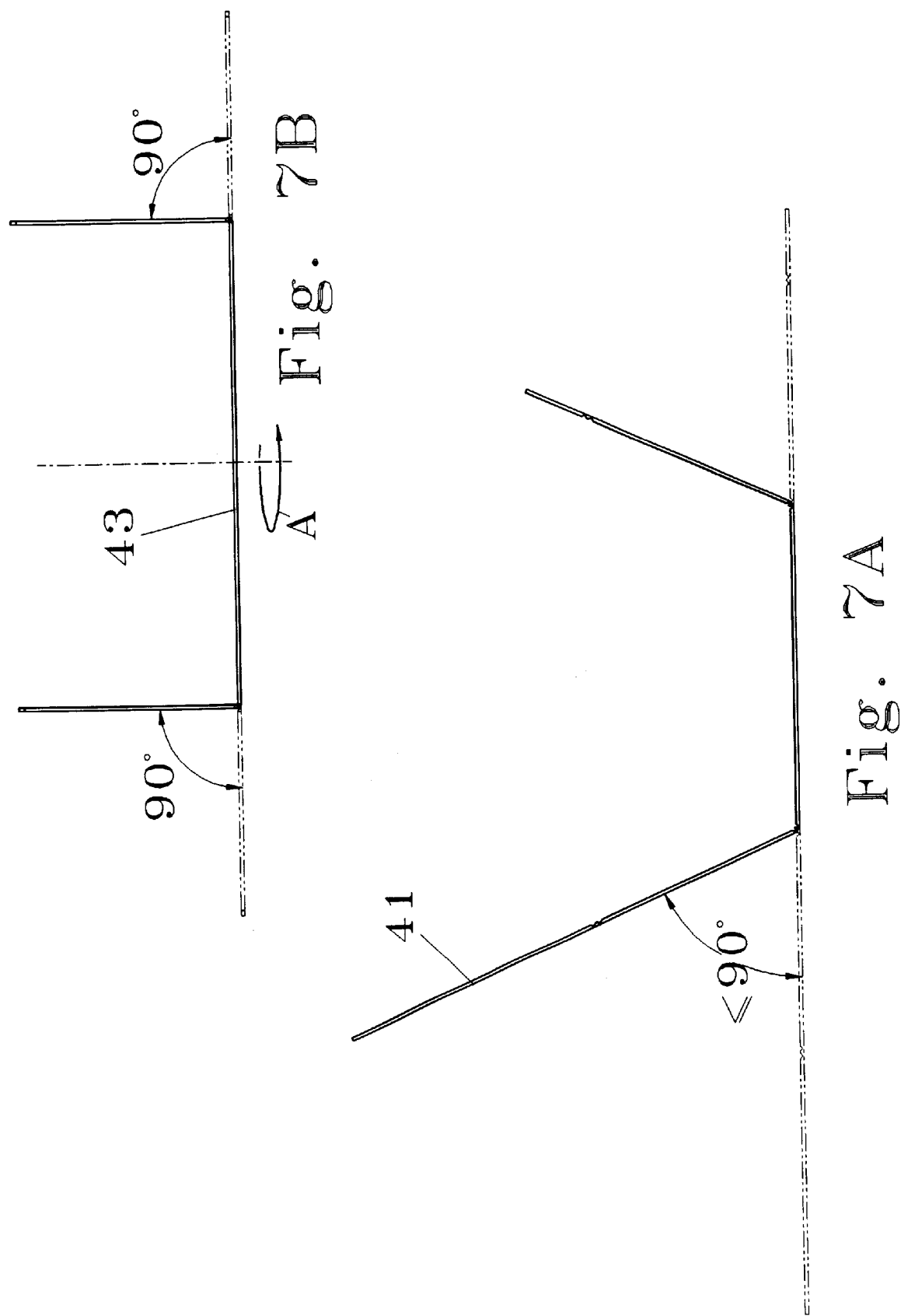

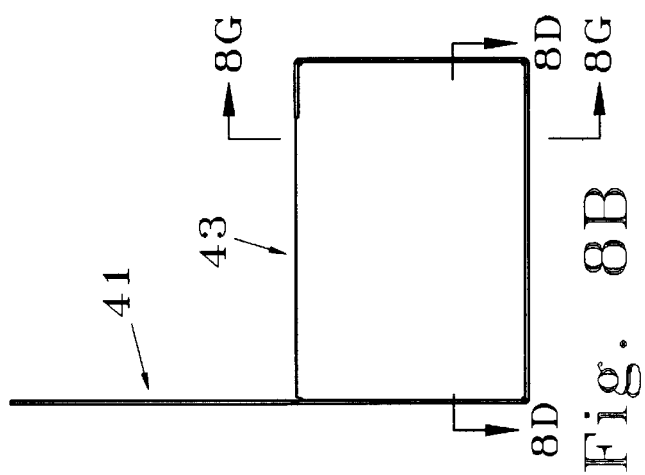
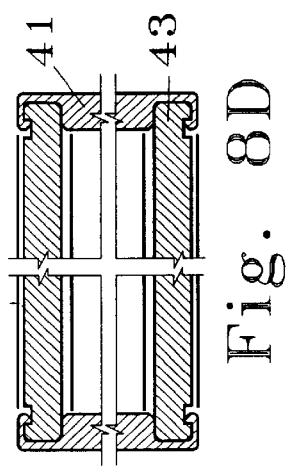
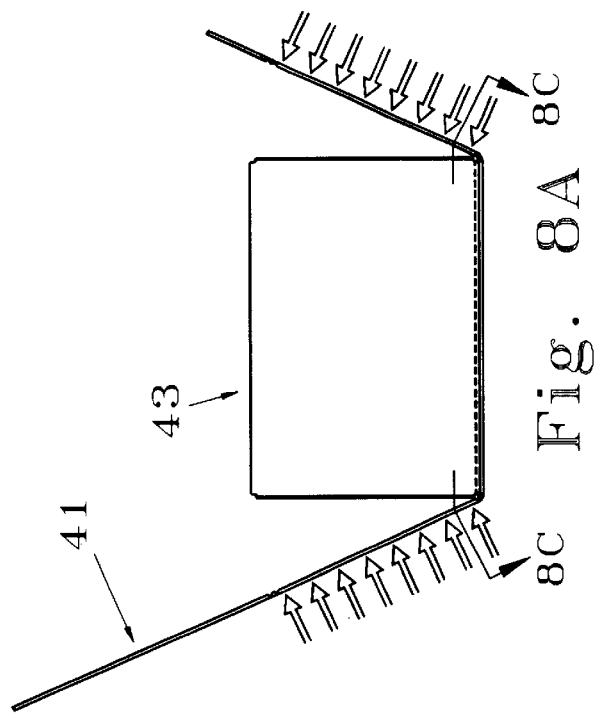
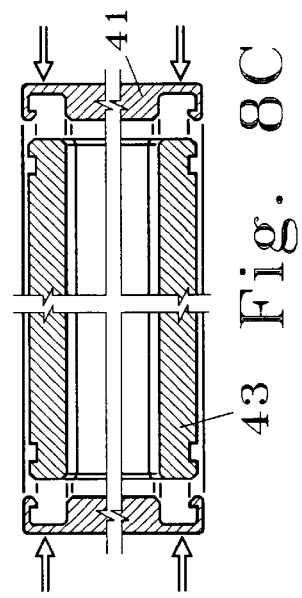
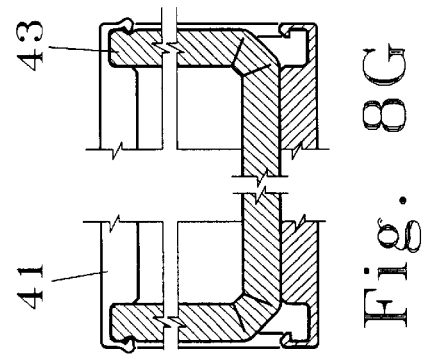

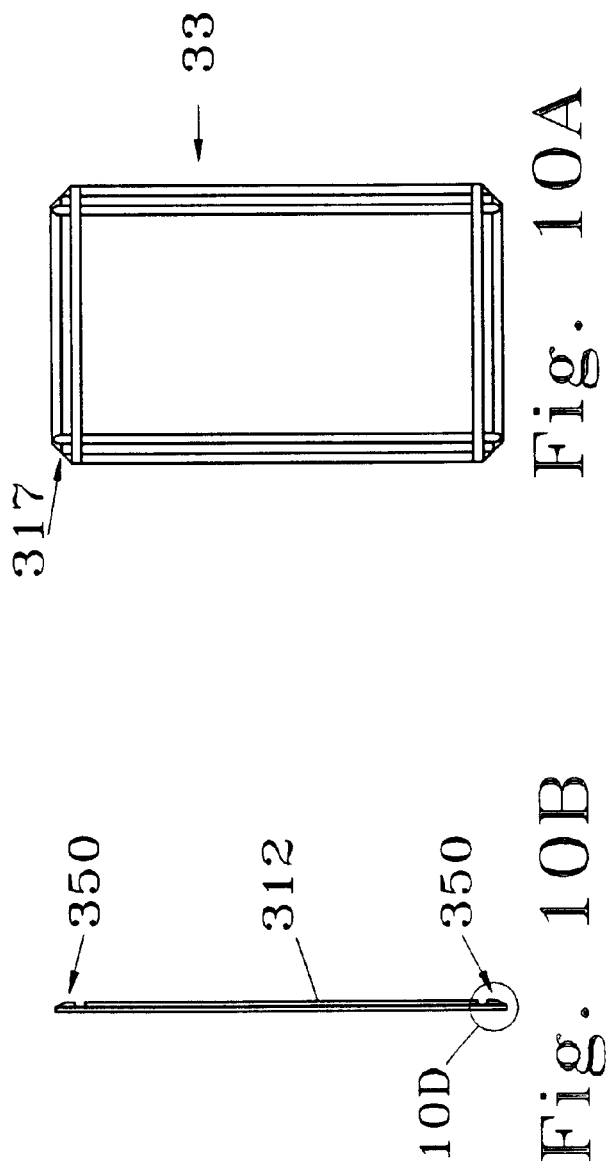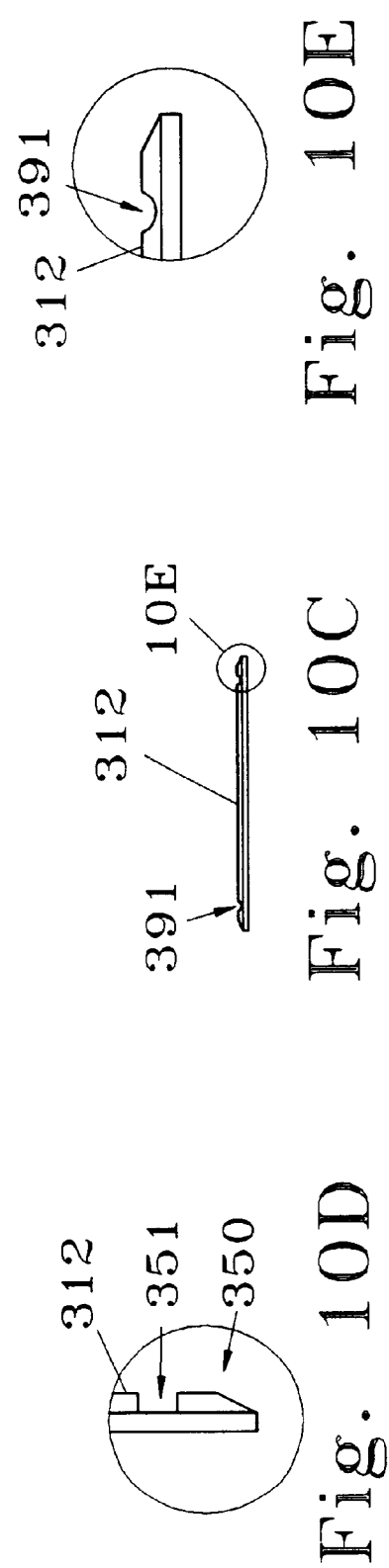

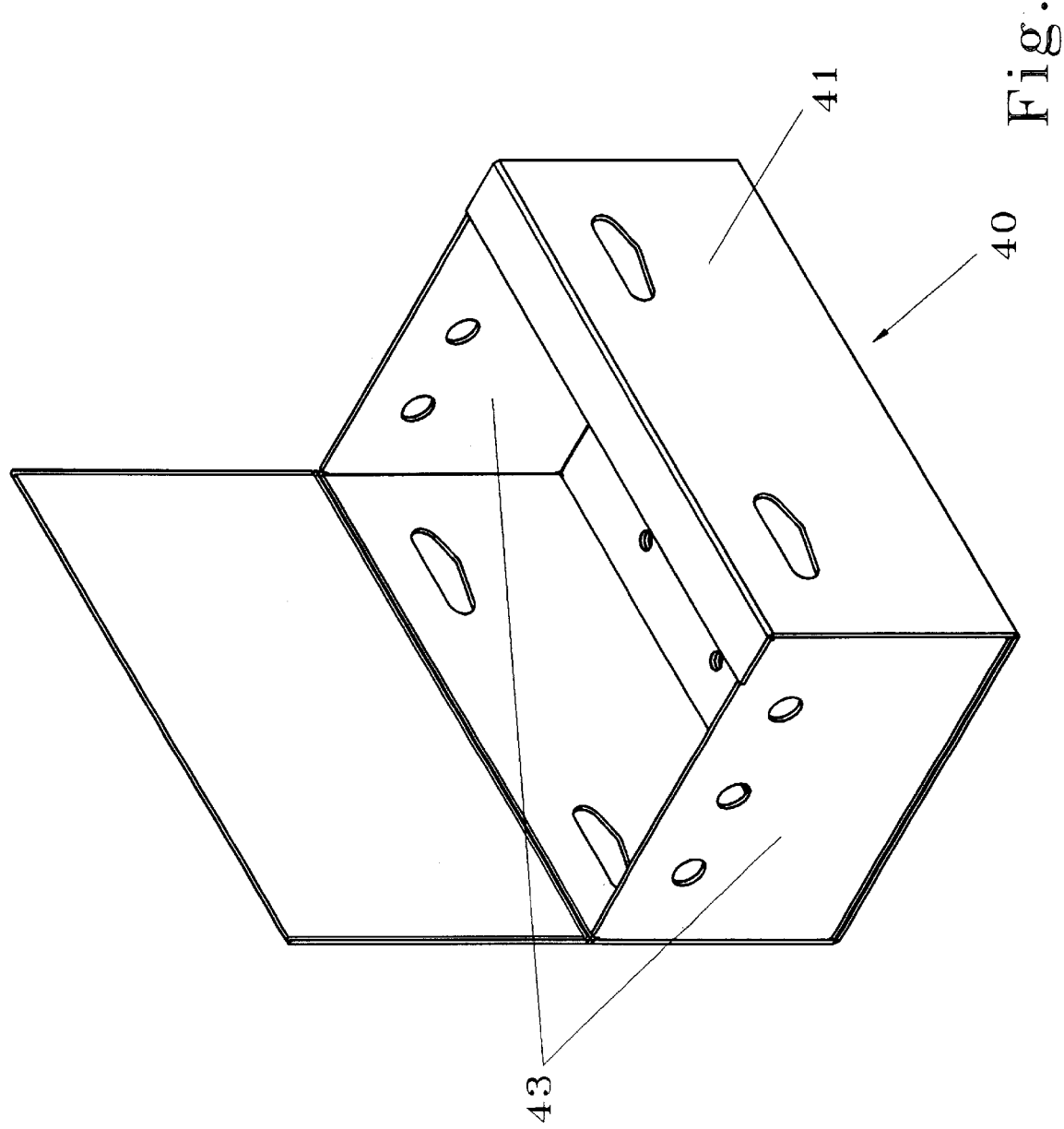

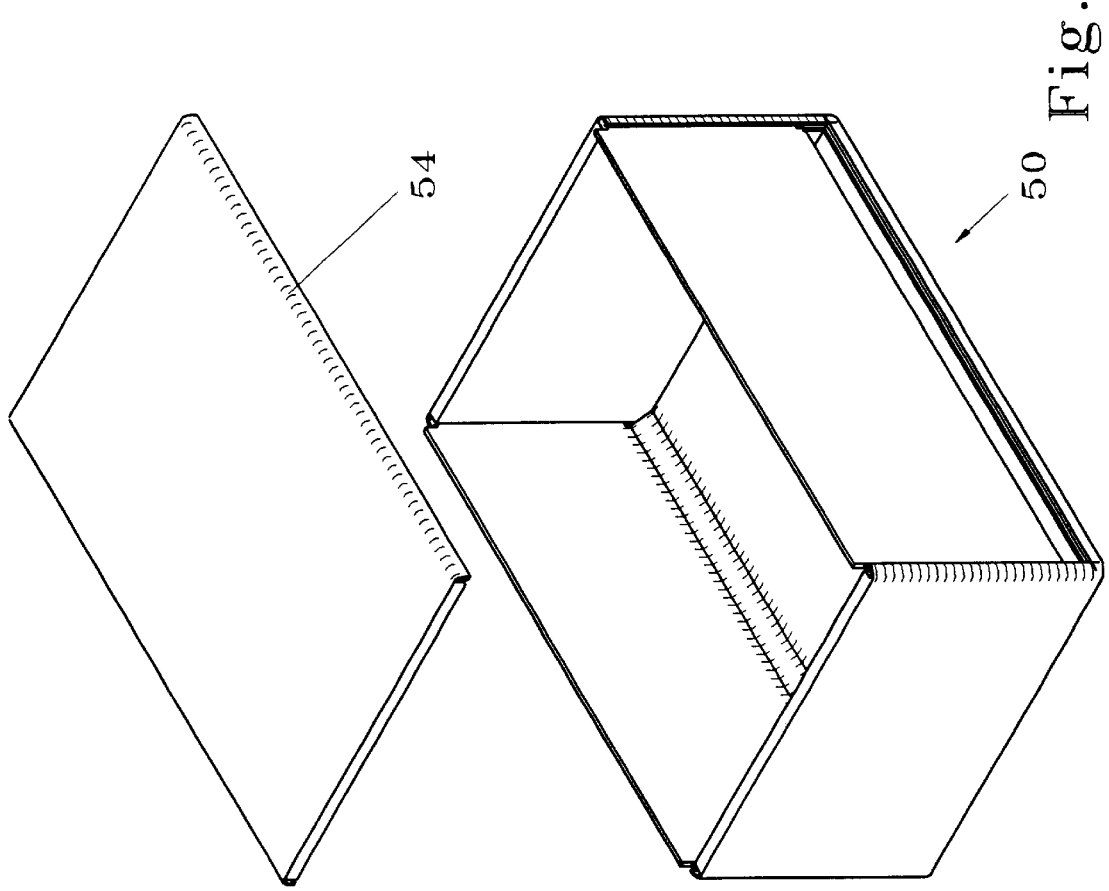

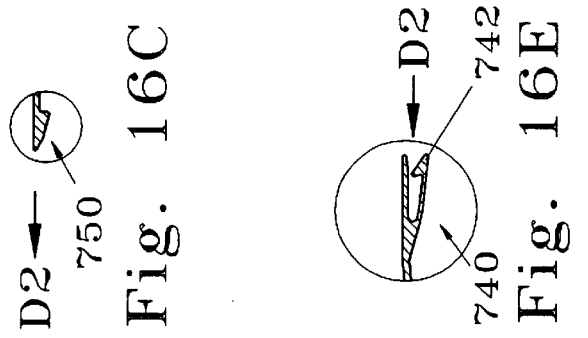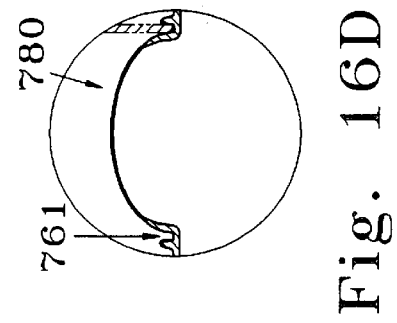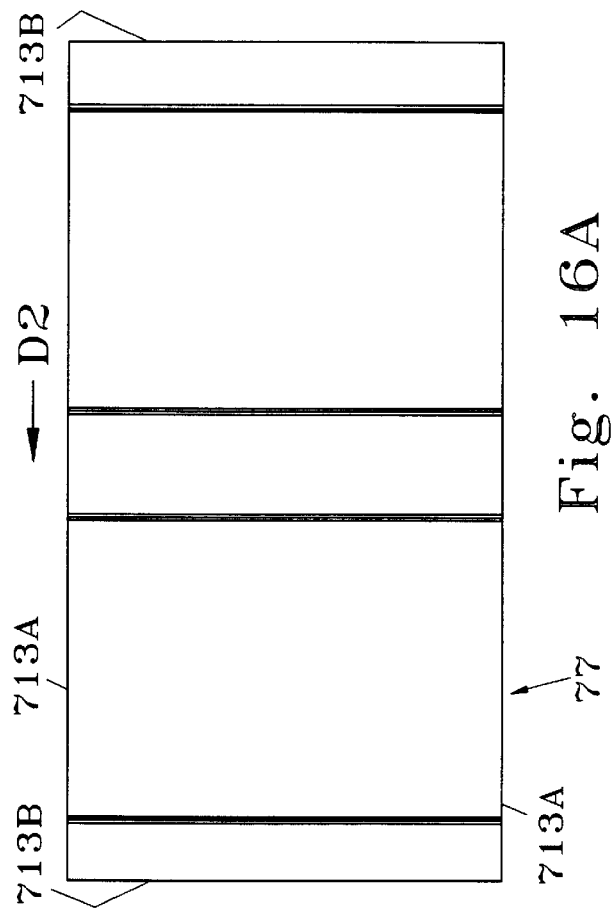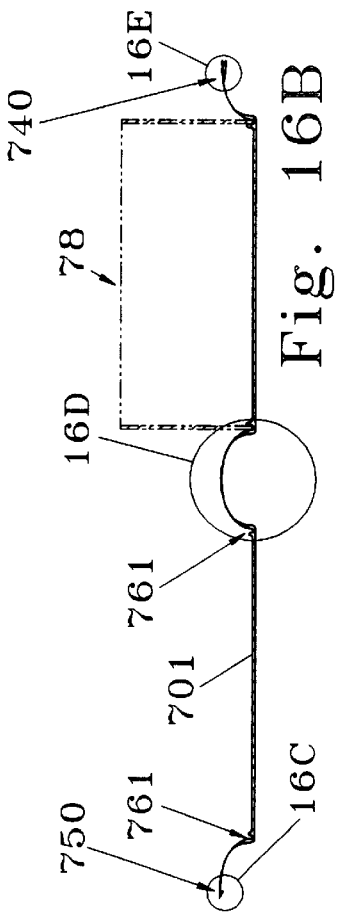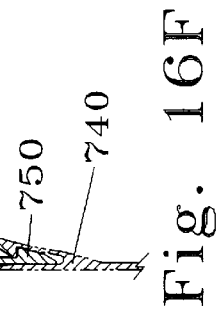

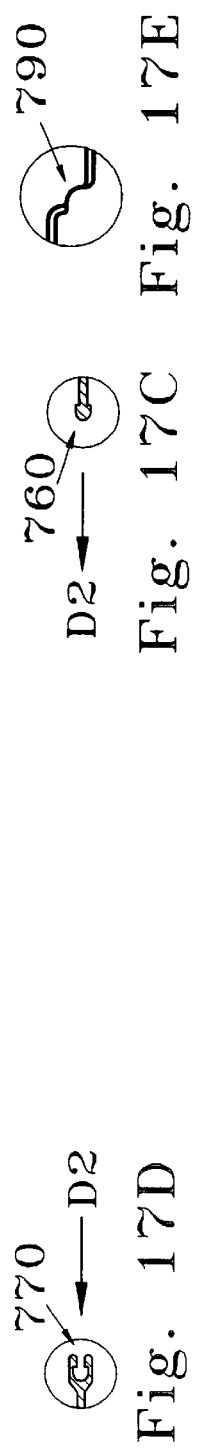
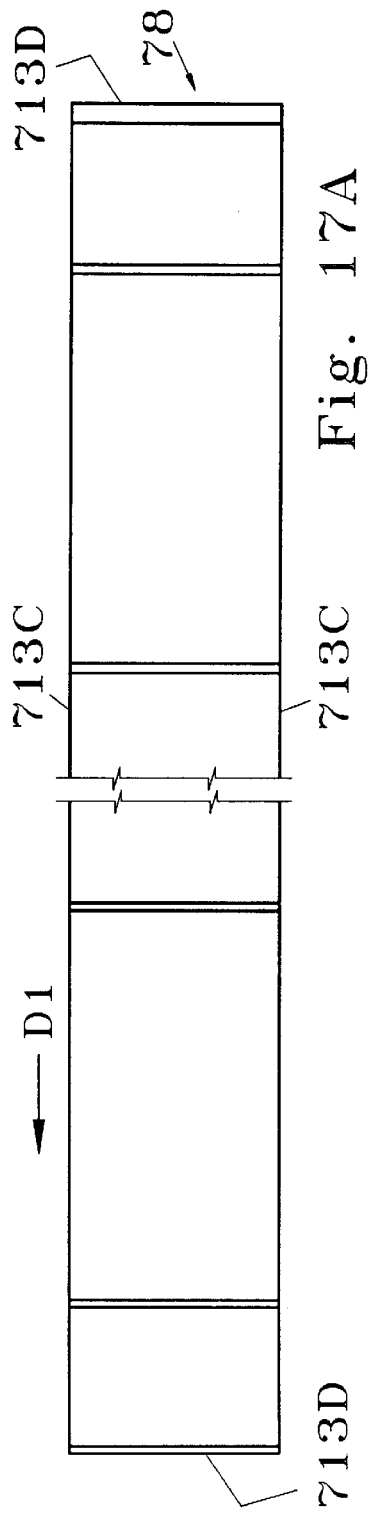
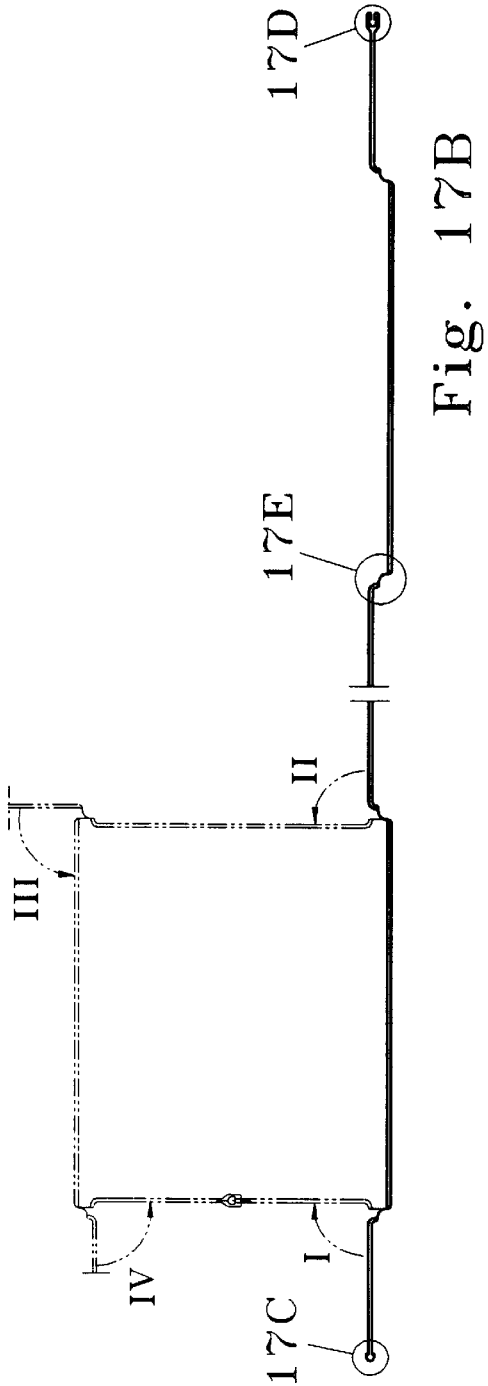

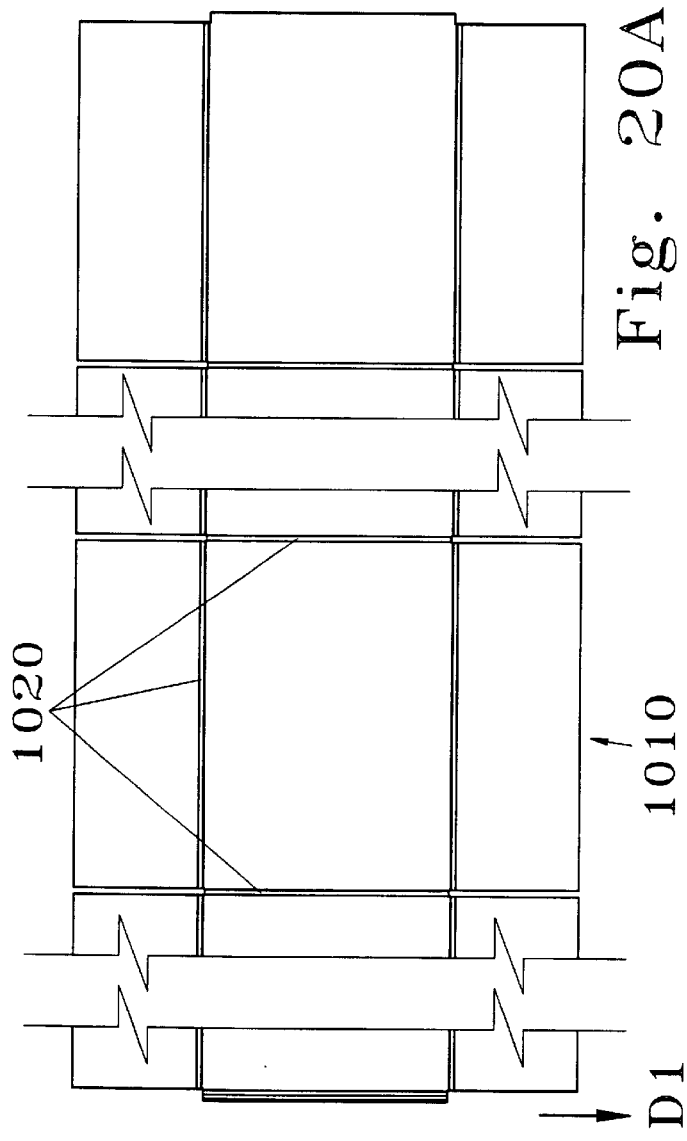
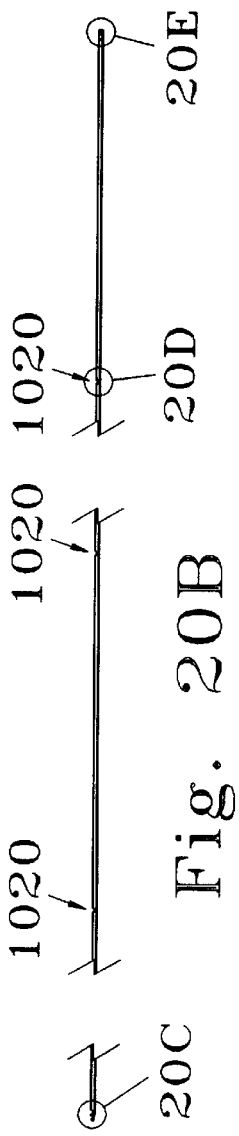
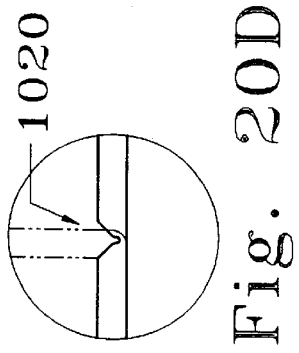
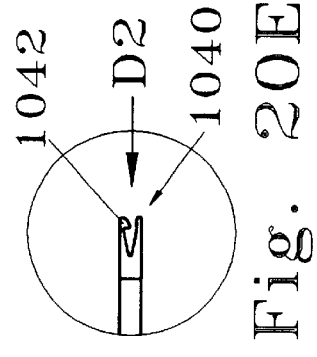
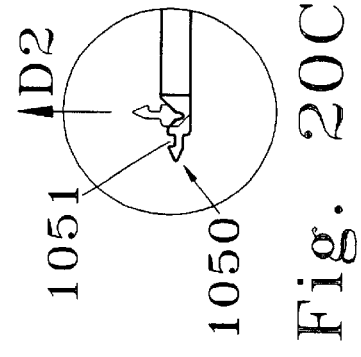

COLLAPSIBLE THREE-DIMENSIONAL ENCLOSURE, AND A METHOD OF MANUFACTURING THEREOF

CROSS-REFERENCE TO A RELATED APPLICATION

This application is a continuation-in-part of application Ser. No. 08/531,325, filed on Sep. 20, 1995 now abandoned.

BACKGROUND OF THE INVENTION

1. Field of the Invention

The invention relates to collapsible, reusable enclosures, in particular to general purpose shipping boxes formed of extruded polymeric materials.

2. Description of Related Art

For better understanding of the present invention, it would be expedient to review the general purpose shipping box industry.

General

Businesses, both nationally and internationally, require an increasing number of boxes in which to store and ship goods. Currently, the box market is dominated by basically standardized general purpose shipping boxes made from corrugated paperboard. The appearance of many standardized boxes is often customized in terms of color and lettering.

In order to grasp the size of the shipping box market, in 1994, according to Fiber Box Association's 1994 Annual Report, US paperboard mills shipped 28 million tons of boxboard (see pg. 1 of the aforementioned Annual Report of the Fiber Box Association), worth over $18.5 billion dollars (see pg. 3), most of it for domestic use. (Boxboard is defined as "paperboard components from which . . . paperboard [is] manufactured", see pg. 16 in the Annual Report). In 1994, 77.3% of the shipping boxes made of the aforementioned boxboard were used for shipping non-durable goods (see pg. 6 in the Annual Report). According to our market research, in the US alone 20 to 40 billion corrugated paperboard boxes are made annually and after only one use discarded.

The term shipping box means a rigid, rectangular container which is used for shipping and often also for storing various products; a shipping box may be with or without a lid. However, when referring to the boxes described in various sources, e.g., patent specifications, we at least once apply the terms by which they are called in the source material, such as containers, crates or cartons. The term general purpose shipping box does not have a well-established definition. It is understood that it should be of a standard dimension and/or capacity prescribed by Federal law or other competent authority; the freight shipping requirements of such boxes are specified in Rule 41 of the Uniform Classification of the National Motor Freight Classification. In this writing, the term general purpose shipping box is used to indicate that the design of such box is not product-specific in: its shape; the way it is assembled from its layout(s) before loading; the way it has to be loaded; and the way it has to be disassembled after it is emptied. Design of a general purpose shipping box should be suitable for loading it in a free-standing position with loose or granular material of reasonable size particles, such as apples, loose candy, or nuts and bolts, or bags of fine-particle substances, or wrapped or not wrapped items of consumer goods.

These boxes are shipped to customers as unfolded, often partially assembled flat layouts, and assembled into three-dimensional boxes wherever the packaging takes place. The assembly is performed by folding pre-creased layouts so that a flap attached to one panel folds over the flaps of another panel, and then locking the foldups into their places.

Smaller packagers usually use foldable corrugated paperboard boxes that have special locking elements, usually in the form of notched tabs, which mate with corresponding slots cut through the layout of the box. Larger-scale packing operations assemble their crates on special assembling (erection) machines which erect and then fasten boxes by more permanent means, such as by glue or staples.

There are some plastic boxes on the market, both collapsible and of permanent shape, but all the plastic boxes, sometimes called containers, are aimed at special niches. Because of their current high cost, boxes made from polymeric materials can compete with the corrugated paperboard shipping boxes only in these specialty markets where wet-strength, multiple use or some other specific requirement becomes an overwhelming issue.

In the context of the present invention the term collapsible is defined for all container-type enclosures as being constructed in such a manner that, when empty, such a three-dimensional enclosure can be collapsed or disassembled to about 1/10 or less of its erected size.

Corrugated Paperboard Shipping Boxes

The term corrugated refers to a packaging material consisting of a central member (medium) which has been fluted on a corrugator and to which one or two flat sheets of paperboard have been glued. The term "corrugated" is also used for polymer sheets which mimic loosely the design of corrugated paperboard. Corrugated polymer sheets will be discussed in the section on the current art of making polymer boxes from such sheets. The term paperboard is the term used by the packaging industry for paper which is thicker than 12 points (0.012").

There are a number of inherent problems arising from the use of corrugated paperboard boxes. The actual strength and environmental resistance of paperboard is determined by the ties between its fibers. These ties are not molecular (chemical) type, as they are in polymers. The ties between fibers in paper, formed by drying a layout of colander-squeezed pulp, are weak even under the most favorable of circumstances. The ties deteriorate completely when the moisture content in this absorbent material rises above the saturation value. Rodents are known to make holes in paperboard boxes. For comparison, most of the polymers used in the packaging and appliance industries have much higher resistance to stress and environmental hazards, such as too much or too little moisture; unlike paperboard, these polymers can be submerged in water with little change in their performance.

In order to increase the resistance of paperboard boxes to moisture in these applications when the product itself is associated with moisture, e.g., lettuce, meat or even frozen fish, or when the boxes with the product will be submitted to the elements, e.g., in military applications, the paperboard for such boxes is previously waxed or treated with chemicals. That adds 50% or more to the price of such wet-strength paperboard boxes, and increase their weight.

There is another shortcoming of paperboard boxes: the porous structure of paperboard lowers its hygienic qualities, as bacteria or other contaminants can easily be absorbed. It is possible to restrict penetration of contaminants into paper by creating a barrier layout. However, this is not only quite expensive, but it also alters the recycling or disposal of such boxes.

Once these 28 million tons of paperboard boxes annually are used, they are discarded and destined either for a landfill or for recycling. In either case this presents US society with considerable environmental and recycling problems. Recycling of paper products is not a cheap or simple process. It involves going again through the making of pulp, which also involves neutralization of hazardous byproducts, mixing recycled pulp with fresh, and the making of paper. Only then can one produce a recycled corrugated sheet. Recycling of polymers used in consumer goods (with the exception of those polymers which were used in batteries or in some other hazardous application) is extremely simple by comparison: the three major steps of recycling plastics are: simple grinding, mixing the grinds with additional new components to replenish their quality; and getting the mix ready for new production via melting, e.g., in an extrusion.

Also, the process of making paperboard uses a great amount of toxic chemicals that need to be recaptured from the technological waste stream and neutralized. The environmental clean-up operations weight heavily on the overall cost of paperboard boxes.

An additional factor in the use of paperboard is the uncertainly surrounding the paper industry, especially regarding the availability of wood pulp to meet the fluctuating needs for paperboard. It takes many years and a large investment to build a papermill, and sometimes even longer to get permission to build one in a given area; but it takes only one decision of some pertinent governmental body to add restrictions on harvesting trees in some given area of timber growth. Because of the aforementioned uncertainty, in 1995 the U.S. price of pulp rose over 30%, from $600 to $900/ton. In 1996 some new papermills became operational, and the price of pulp went down again. The climate of uncertainty is further enhanced by frequent regulatory changes regarding recycling of paperboard, and regarding landfills.

Plastic Shipping Boxes

While the use of plastic boxes eliminates some of the above cited inherent problems of the paperboard box industry, the current art of designing and manufacturing plastic shipping boxes is too expensive to compete with corrugated paperboard boxes anywhere but in specialty markets.

Currently used collapsible plastic enclosures, e.g., shipping boxes, fall into one of two broad groups. The first group consists of collapsible plastic enclosures which mimic the paperboard box industry with this difference: instead on cutting layouts out of a sheet of corrugated paperboard, the layouts are cut out of a plastic sheet. Thereafter the plastic layouts are creased, folded and fastened by traditional means of the paperboard box industry: flaps of the layouts are fastened to their respective places by gluing, stapling, or inserting special locking elements, usually in the form of notched tabs, into corresponding slots cut through the layouts. Apart from extrusion of plastic sheet instead of corrugating paperboard into corrugated sheet, these collapsible enclosures have not incorporated any of the opportunities offered by plastics as a vastly different material into their design and production technology.

Collapsible boxes for asparagus made of extruded hollow sheet of corrugated polyethylene and marketed by Advanced Box Corporation of Tracy, Calif., are a case in point. These boxes are assembled by inserting a number of tabs into corresponding slots, just as one assembles that kind of paperboard box. This process requires either costly manual labor to insert all of the tabs, or special machinery. It is also difficult to remove all of the tabs from the slots to collapse the boxes for future use.

Characteristically, there are a number of patents on various design solutions of this group which claim both "paper" and "various materials", which includes polymers. Thus, U.S. Pat. No. 2,757,851, issued to George Moore, describes a container made of a plurality of generally elongated blanks of relatively rigid or semi-rigid material which are fastened into enclosures by gluing tabs to the mating surfaces.

Strictly speaking, boxes with either stapled or glued/welded flaps are not reusable as such: a layout of a disassembled enclosure which was stapled, glued or welded during its assembly is no longer the same as before its assembly. Still, designs of this group are preferred by the paperboard box producers who want to expand into making plastic boxes as an alternative to the wet-strength paperboard boxes. Therefore, this subdivision of 'almost reusable' plastic boxes has to be considered. Furthermore, any new truly reusable polymer shipping box, before it will establish itself in the marketplace well enough to support a servicing substructure necessary for recirculation (e.g., retrieval and cleansing of already used boxes), has to compete against the polymer boxes designed like corrugated paperboard boxes.

Corrugated plastic sheets used for the enclosures such as shipping boxes are between 2 and 5 mm thick, with 0.2 to 0.3 mm thick side-walls, and 0.1 to 0.25 mm thick ribs between them, spaced about one thickness of a sheet apart. They are usually made from high density polyethylene or polypropylene; other polymers are either too brittle, e.g., rigid PVC, or too expensive, such as PET.

Pound per pound, these thin-rib corrugated sheets made of high density polyethylene or polypropylene are more expensive and less rigid than the corresponding corrugated paperboard in its dry state. The lesser rigidity of the corresponding corrugated polymer sheets is due to two factors: the high shrinkage and the low rigidity of the polymers currently used for these thin-walled corrugated polymer sheets.

The high shrinkage leads to substantially bent spacing ribs in the thin-walled corrugated polymer sheets which reduces the rigidity of these sheets. The rigidity of these polymer sheets is further reduced by low modulus of elasticity of the polymers currently used for such sheets. Modulus of elasticity of high density polyethylene is around 930 MPa, and of polypropylene around 950 MPa. In comparison, the modulus of elasticity of wood in the direction of its growth, which affects the rigidity of paper, is from seven to fifteen times higher (7,000 to 14,000 MPa).

In other words, corrugated sheets made from pure high density polyethylene, polypropylene and a host of other pure polymers are not well suited for general purpose shipping boxes: either they are too brittle, or their price is at least twice as high as that of the stability-wise compatible corrugated paperboard under conditions favorable to paperboard environment. In other words, corrugated plastics sheets made of pure polymers are either too expensive to compete with paperboard for general purpose enclosures, or not enough rigid to withstand the same transportation stacking height as paperboard enclosures can in favorable conditions.

Another serious shortcoming of the enclosure designs of this group is that they repeat all the typical shortcomings of the corrugated paperboard box designs. For instance, only from 60% to 80% of the sheet goes to form the outside panels of the enclosure; the rest goes to multi-layered foldups and cut-offs.

Most of the collapsible plastic boxes the design of which depart from traditions of the corrugated paperboard industry are designed for production by molding. One of quite common features of such designs is that two functions, that of positioning and that of retention of the connection between panels of the same layout, or the adjacent panels of different layouts, are achieved by separate means.

Here is an example of such a design. A knockdown shipping container, described in U.S. Pat. No. 3,675,808, given to D. Brink in July 1972, presents a single foamed polystyrene layout which is erected into a five-panel enclosure by folding up two side walls (14 in FIG. 1 [when discussing the prior art here and hereinafter, the reference numerals belong to the descriptions and drawings of the corresponding patents under discussion]) along the special folding grooves (18 in FIGS. 5 and 7), and two end walls (12 in FIGS. 1, 2 and 3). The vertical joints between the adjective vertical panels (the respective side walls and end walls) are in position when the ears (26 in FIGS. 1 and 3) of the side walls 12 are thrust into the complimentary openings (28 in FIGS. 1 and 3) formed into the end walls 14. The retention of the vertical joints is attained by a strip of adhesive tape secured around the outer surfaces of the end and side walls. Such a connection is not reliable. Also, in order to disassemble such a shipping container, the adhesive tape has to be peeled off. In that sense, the connection between a pair of folded up adjacent side walls is irreversible: a new adhesive tape is required for the next assembly.

Here is another, more sophisticated version of the same kind of design solution, where the positioning and retention of a vertical joint of two adjective vertical panels are provided by separate means. In U.S. Pat. No. 3,924,798, given to S. Seveth in December 1975, the positioning is secured by a system of grooves and edges, whereas the retention of the assembly and disassembly of the box is provided by snapping closed and un-snapping four pairs of alike hooks (marked 168, 170, 176, 178, 180, 182, 172 and 174 in FIG. 6), where a hook is interlocked with its complementary hook when inserted into it under a 90° angle. The retention capability of such interlocking hooks has to be overpowered in order to disassemble the enclosure; since a latching-type retention elements are not used in this design, either the retention ability of such directly elasticity-and friction-dependent interlocking elements is low, or the elements are bound to lose some of their former retention capacity after each assembly and disassembly.

U.S. Pat. No. 3,497,127, given to T. Box in February of 1970, the container is assembled and disassembled by locking and un-locking four complicated special interlocking elements or flaps (16 in FIG. 1) which have special retention slots in the mating walls. One of the shortcomings of this design is that the walls (12 in FIG. 1) of the filled plastic case are retained strongly in one direction, much less strongly in the opposite direction.

In U.S. Pat. 4,235,346, given to J. Ligget in November 1980, the vertical positions of the assembled side walls (13, 14, 14a and 15 in FIG. 1) are guided by four edges (20' in FIG. 1) and the respective grooves (25 in FIG. 1). But the retention germane to the functioning of the container is secured only after the lid (17 in FIG. 1) is closed.

In U.S. Pat. 5,501,354, given to P. S. Stromberg in March of 1996, the grooves (marked C in FIG. 1) in the end panels (16 and 16A in FIG. 1) and the complimentary edge along the vertical edges of the side panels (14 and 14A in FIG. 1) define the positions of the vertical edges of an assembled collapsible container, but the grooves and edges by themselves do not provide for the appropriate retention for the working of the container. The retention is performed by four separate hinged locking flaps (marked f in FIG. 1).

In U.S. Pat. 5,551,568, given to Niles et al. in September 1996, the positioning of the respective side walls is secured by tongue and groove connections, whereas the retention is secured by interlocking two separately placed latches (52 in FIGS. 1, 2, etc.) of both layouts with the respective special seats formed in the opposite layouts.

All the aforementioned designs of this group are geared for molding. Molding of polymers, however, is not cheap. Molding as a manufacturing technology, especially injection molding, has three major shortcomings. First, the molds have to heated and cooled once every production cycle, which is wasteful of energy on two accounts: the energy is pumped into usually massive metal molds, and thereafter the molds are artificially cooled down for the next cycle, the same energy being pumped into the cooling system with little recovery. Only a small portion of the total energy used goes for forming the product from resin.

Second, the material should be cooled down considerably while still in the mold, which is time-consuming for labor and equipment alike. Third, the, valves, cylinders, clamps, and other attributes of the molding machinery are in constant change, which requires a sophisticated system of controls, as well as highly skilled set-up people. Besides, injection molding is associated with runners which need to be removed, reground and reused.

The need for centralized cooling demands that injection machines should operate in clusters of usually eight molding machines. In other words, there is no such thing as a small but efficient injection molding operation with two-three small machines.

Production via polymer extrusion, on the other hand, is the most effective method of production. In addition to being continuous in its mode of operation, it is free of all the above-mentioned shortcomings of molding. Unfortunately, there are very few designs of polymer enclosures specially geared for extrusion which do not mimic designs of boxes made from paperboard.

Clarey, et al., in U.S. Pat. No. 5,066,832, Plastic Enclosure Box for Electrical Apparatus, issued in November 1991, discloses an extruded plastic box formed of multiple, differently-shaped sections adapted to receive metal and plastic inserts. This box is not designed for disassembly, and is difficult and expensive to fabricate.

An interesting solution for a particular feeding problem is provided by Boeckmann, et al., in their Carrier Tape, U.S. Pat. No. 4,708,245, given in November 1987. This invention provides a solution for storage, transportation and automatic feeding of small and/or measured items, such as electronic components, pharmaceuticals and similar products. The carrier tape is formed of extruded plastic, and has interlocking joints extruded into the profiles of its stripe-like elements. The interlocking joints have retention elements built into them. Sprockets are provided for driving the tape. The components of the carrier tape are significantly different in shape, and thus have different manufacturing requirements. Further, the base-and-cover-strip construction of the carrier tape cannot be collapsed to minimize storage space. However, the carrier tape of the aforementioned invention cannot be redesigned into a five-sided enclosure.

Here is another invention allowing the use of extrusion of a continuous web with interlocking profiles for making enclosures. In U.S. Pat. No. 4,299,070, given to Oltmanns, et al., in November 1981, and titled Box Formed Building Panel of Extruded Plastic, a four-sided enclosure is discussed. A building panel is formed of multiple extruded plastic components joined together by a wedge-shaped projection fitting into a sealant-containing groove. This invention has a number of shortcomings: First, it provides only for four-sided enclosures. Second, the multiple components of this panel must be separately fabricated, and precisely inserted. Third, the enclosure cannot be easily disassembled.

In the late 1980-es, the Italian company CR&S in Roletto, using the expertise of another Italian company (the KARTO in Bressanno) in extruding wood-filled polypropylene sheets for the automotive industry, adjusted that technology for mass production of so-called fruit crates. CR&S's fruit crate is a lidless, collapsible container which holds about 18 lb. to 20 lb. of product. It is meant for field-gathering of table grapes and other fruits, and their direct delivery to the marketplace.

One unique feature of this fruit crate is that the sheet for the crates is made from only 10% to 20% of virgin polypropylene resins; the rest is reground polypropylene (30% to 40%), and wood chips (about 50%).

Their collapsible, reusable fruit crate is made of a combination of extruded sheet material and molded corner pieces. The four corner pieces per crate added the high cost of injection molding from new resin. No wonder the cost of their four molded small corner pieces is over 30% of the overall cost of a fruit crate.

In order to improve the rigidity of their fruit crate, special rigidity ribs are vacuum-molded in all four sides and the bottom of their open-top enclosure. That added the cost of four plastic sheet forming machines and molds to the overall equipment, increased the cost of labor, and more than doubled the cost of energy.

The special rigidity ribs, together with some other design aspects, added $500,000 in special tooling cost for each particular size of product, to say nothing about the time and expense of setting up different tooling at every change-over.

Their design is associated with stamping out about 37% of the sheet material. And, because of their wood-filled composition, they have difficulty reusing it.

All collapsible plastic boxes known to us, including the aforediscussed CR&S's fruit crates, are not versatile enough in their applications or technologically sound enough in their production options to offer a viable substitution for the currently dominant general purpose shipping box made from corrugated paperboard.

Objects of the Invention

It is an object of this invention to provide a collapsible, three-dimensional enclosure with at least five side surfaces made from extruded inexpensive plastic material which is reusable, simple and versatile in design, advantageous in the use of the direction of extrusion for maximum strength of the enclosure, easy to assemble without using glue, staples, adhesive tapes, additional corner pieces, overlapping retention flaps or other added means of retention, easy to disassemble without the need to overpower the retention capacity of interlocking elements, easy and inexpensive to manufacture, suitable for an in-line mass production, may be produced practically without any production wastes, and is superior to the currently used corrugated paperboard shipping boxes.

These and other objects and advantages of the present invention will be more apparent from the ensuing description of the invention with reference to the accompanying drawings.

SUMMARY OF THE INVENTION

The invention provides a collapsible three-dimensional enclosure having at least five side members and comprising at least one first layout that contains at least one of the side members and at least one second layout that contains at least two of the aforementioned side members interconnected through a foldable connection. The first layout and the second layout each has a substantially rectangular configuration defined by a first pair of parallel edges and a second pair of parallel edges which are substantially perpendicular to the first pair of parallel edges. Locking elements are formed in the proximity to at least one pair of the parallel edges of the second pair of parallel edges. These locking elements are selected from the group consisting of a male locking element and a complementary female locking element with a groove extending in a first direction, each male locking element being insertable into the groove of the complementary female locking element in a second direction substantially perpendicular to the first direction with a snapping action which forms a rigid connection irreversible in the second direction but being slidable in the first direction so that the side members can be disassembled by sliding one of the layouts with respect to the other.

Provided also is a method of manufacturing the aforementioned enclosure by extruding the webs of respective layouts simultaneously with their respective locking elements; when it is needed, periodically forming folding means into the web perpendicular to the direction of extrusion; continuously slicing the web into layout-width strips which have locking elements in the proximity of their edges; periodically cutting from the webs the layout-length portions, so that a number of the layouts are produced simultaneously; thereafter assembling the three-dimensional enclosures by folding the complimentary layouts and snapping respective male projections into complementary female grooves.

Rigidity of the enclosure is ensured by the fact that the connection between a male locking element and a complimentary female locking element is irreversible in the direction of insertion. The relative ease of disassembly of the three-dimensional enclosure into its respective layouts is ensured by the fact that the connection between male and complimentary female locking elements can be disconnected by sliding them apart in the direction substantially perpendicular to the direction of insertion.

BRIEF DESCRIPTION OF THE DRAWINGS

FIG. 2A is a top view of the outer layout, according to the first embodiment of the invention;

FIG. 2B is a side view of the outer layout, according to the first embodiment of the invention;

FIG. 2C is a front view of the outer layout, according to a preferred embodiment of the invention;

FIG. 2D is an enlarged, detailed view of a selected area in FIG. 2B;

FIG. 2E is an enlarged, detailed view of a selected area in FIG. 2C;

FIG. 3A is a top view of the inner layout, according to the first embodiment of the invention;

FIG. 3B is a side view of the inner layout according to the first embodiment of the invention;

FIG. 3C is a front view of the inner layout, according to the first embodiment of the invention;

FIG. 3D is an enlarged, detailed view of a selected area in FIG. 3B;

FIG. 3E is an enlarged, detailed view of a selected area in FIG. 3C;

FIG. 5A is a top view of the outer layout, according to the second, equally preferred embodiment of the invention;

FIG. 5B is a side view of the outer layout, according to the second, equally preferred embodiment of the invention;

FIG. 5C is a front view of the outer layout, according to the second, equally preferred embodiment of the invention;

FIG. 5D is an enlarged, detailed view of a selected area in FIG. 5B;

FIG. 5G is an enlarged, detailed view of a selected area in FIG. 5C;

FIG. 6A is a top view of the inner layout, according to the second, equally preferred embodiment of the invention;

FIG. 6B is a side view of the inner layout, according to the second, equally preferred embodiment of the invention;

FIG. 6C is a front view of the inner layout, according to the second, equally preferred embodiment of the invention;

FIG. 6D is an enlarged, detailed view of a selected area in FIG. 6B;

FIG. 6E is an enlarged, detailed view of a selected area in FIG. 6C;

FIG. 6G is an enlarged, detailed view of a selected area in FIG. 6C;

FIG. 7A illustrates the first step of a method for assembling the embodiments of the invention which have two layouts and in which the two layouts are to be interlocked with one another at assembly;

FIG. 7B illustrates the second and third steps of that method of assembly;

FIG. 8A illustrates the fourth step of that method of assembly;

FIG. 8B illustrates the fifth step of that method of assembly;

FIG. 8C is a section in FIG. 8A;

FIG. 8D is a section in FIG. 8B;

FIG. 8G is a section in FIG. 8B;

FIG. 10A is a top view of a side piece, according to the third, equally preferred embodiment of the invention;

FIG. 10B is a side view of a side piece, according to the third, equally preferred embodiment of the invention;

FIG. 10C is a front view of a side piece, according to the third, equally preferred embodiment of the invention;

FIG. 10D is an enlarged, detailed view of a selected area in FIG. 10B;

FIG. 10E is an enlarged, detailed view of a selected area in FIG. 10C;

FIG. 11 is an isometric view of an invented enclosure, according to the fourth, equally preferred embodiment of the invention;

FIG. 12 is an isometric view of an invented enclosure, according to the fifth, equally preferred embodiment of the invention;

FIG. 16A is a top view of the outer layout, according to the seventh, equally preferred embodiment of the invention;

FIG. 16B is a front view of the outer layout, according to the seventh, equally preferred embodiment of the invention;

FIG. 16C is an enlarged, detailed view of a selected area in FIG. 16B;

FIG. 16D is an enlarged, detailed view of a selected area in FIG. 16B;

FIG. 16E is an enlarged, detailed view of a selected area in FIG. 16B;

FIG. 16F is a side view of the prying tool, according to the seventh, equally preferred embodiment of the invention;

FIG. 17A is a top view of the inner layout, according to the seventh, equally preferred embodiment of the invention;

FIG. 17B is a front view of the inner layout, according to the seventh, equally preferred embodiment of the invention;

FIG. 17C is an enlarged, detailed view of a selected area in FIG. 17B;

FIG. 17D is an enlarged, detailed view of a selected area in FIG. 17B;

FIG. 17E is an enlarged, detailed view of a selected area in FIG. 17B;

FIG. 20A is a top view of a single-layout three-dimensional enclosure, according to the tenth embodiment of the invention;

FIG. 20B is a front view of a single-layout three-dimensional enclosure, according to the tenth embodiment of the invention;

FIG. 20C is an enlarged, detailed view of a selected area in FIG. 20B;

FIG. 20D is an enlarged, detailed view of a selected area in FIG. 20B; and

FIG. 20E is an enlarged, detailed view of a selected area in FIG. 20B.

DETAILED DESCRIPTION OF THE INVENTION

Figure 1:
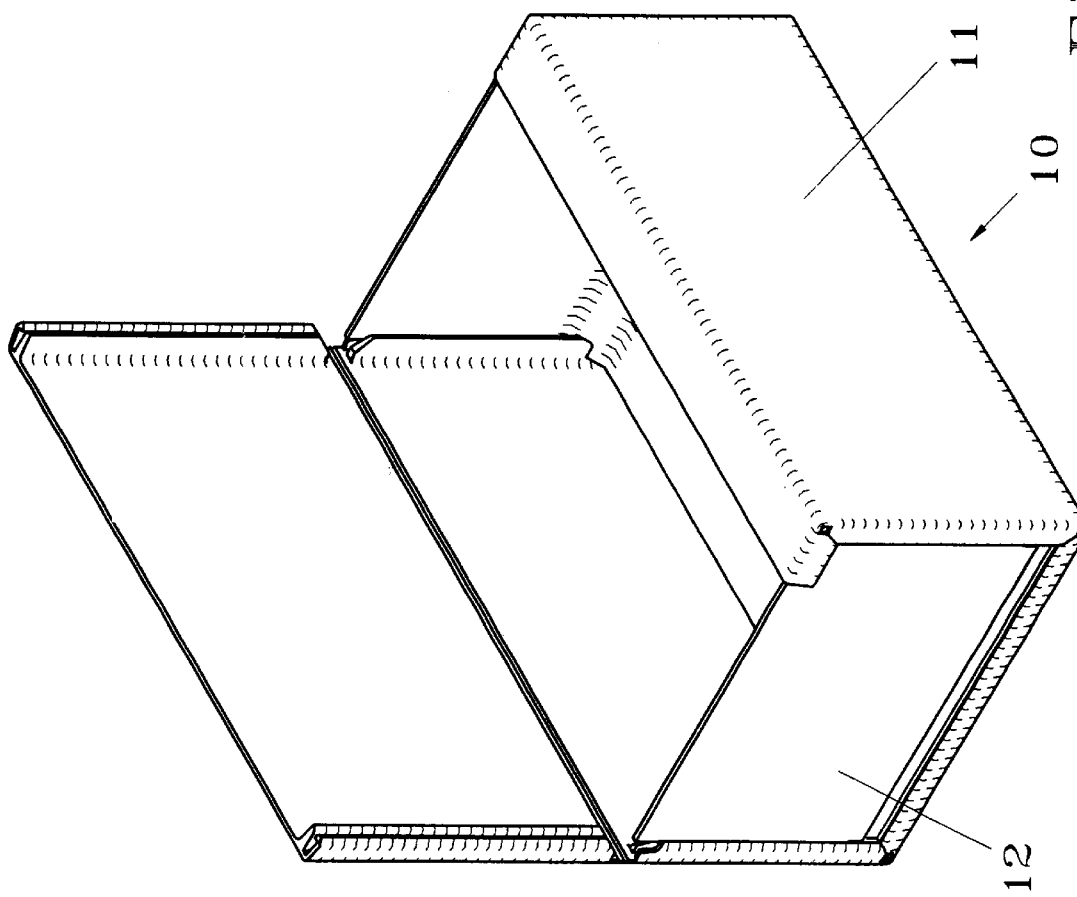
FIG. 1 is an isometric view of the invented enclosure, according to a first preferred embodiment of the invention.

The following is general information common to all embodiments of the invention which will be described later.

The invention provides a collapsible enclosure, e.g. an invented box, formed of polymeric material that can be easily assembled from at least two separate, substantially rectangular layouts, and disassembled into the layouts for storage and shipping to packaging locations. This invention also provides a method of mass production of the layouts for Invented boxes.

The outer and inner layouts are formed of any semi-flexible and extrudable material, such as polymeric materials. Most of the polymeric materials are superior to the currently used corrugated paperboard, as they are more hygienic, more resistant to bacteria, insects and rodents, and more resistant to moisture. In addition, Invented boxes use less material than comparable paperboard shipping boxes. For example, the third embodiment of the invention (see FIGS. 9 to 11) requires over 30% less sheeting than one of the most popular corrugated paperboard box, the so-called "regular slotted box" (RSC for short, see Fiber Box Handbook, published by the Fiber Box Association in 1987, pg. 18).

The layouts are formed by extrusion or coextrusion directly from raw material in the form of powder or pellets, and the ready layouts packaged at the end of the same production sequence. As many identical layouts of a particular width can be extruded simultaneously in the same web as can be handled by a given extruder, or extruders, and the extrusion die. The length of the production line is largely determined by the length it takes to cool down a freshly extruded, moving web of layouts, so that the web can be creased and cut into individual layouts. At the end of such a production line, the layouts can be packaged and be ready to be shipped to customers.

Extrusion and coextrusion technologies offer two major advantages—the ease by which the locking elements are extruded out of polymeric materials along the entire length of layouts, and the low cost of mass production. In fact, extrusion is one of the least costly mass production methods known to man. Most advantageous materials for collapsible polymeric enclosures may be selected from a class of highly filled polymer compositions, such as those discussed in co-pending U.S. patent application Ser. No. 08/531,458, filed on Sep. 20, 1995 by one of the Applicants of this invention, and also filed with PCT. These filler compositions have considerably higher modulus of elasticity and at least twice less shrinkage than the non-filled polyethylene and polypropylene mentioned in the section of prior art. These polymer compositions, filled with materials such as fly ash and recycled plastics, are also less expensive. There is reason to believe that sheets extruded from these compositions may be less expensive than corrugated paperboard of equal strength.

In preferred embodiments of the invention, two layouts formed of polymeric material are extruded from raw material and folded at creases. The two layouts can be of different thicknesses. The two folded layouts are joined to form a box by snapping together male and female locking elements adapted for complementary, side-ways releasable inter-engagement.

The snap-interconnection is achieved by the action of at least one flexible element and at least one arresting element in each pair of complimentary locking elements. In a free state, such a flexible element has a certain dimension, we call it "first dimension". During the insertion of the male element into the groove of the corresponding female element, the flexing element is first deformed and then at least partially released closer to its free state, which we call "second dimension". That partial or fill release occurs at a predetermined depth of insertion. The fully or partially released flexing element of one locking element gets arrested by an arresting element in the other locking element, which occurrence completes the irreversible connection of the two locking elements in the direction required for the functioning of the erected (assembled) three-dimensional enclosure.

The direction of insertion is the direction in which a male locking element is inserted into the groove of the corresponding female locking element; we call that direction "second direction". The direction of insertion also substantially coincides with the direction of the most needed retention germane to the three-dimensional enclosure remaining in its erected (assembled) state. However, so interlocked locking elements can be easily disengaged by sliding the male locking element out of the groove of the female element side-ways, which is substantially perpendicular to the direction of insertion. The side-ways sliding direction of disengagement is the same direction in which the layettes have been extruded; we call that direction "first direction" and "direction of extrusion". In other words, all the grooves of female locking elements and the inserts of the male locking elements, as well as all the flexing elements and the arresting elements which make the snapping action possible, are extruded in the same direction.

In order to simplify the discussion of this invention, we identified the direction of extrusion on some of the attached drawings by D1 (FIGS. 16A, 17A, 20C and 20E). This is also the direction in which all the locking elements are oriented, and the direction in which the side-ways sliding disassembly of otherwise irreversibly interconnected locking elements can be disengaged. The direction of insertion is marked by D2 in several layout drawings (FIGS. 16C, 16E, 17C, 17D and 20A). This is also substantially the same direction in which a pair of complimentary locking elements gets irreversibly connected. For all the embodiments of three-dimensional enclosure, D1 and D2 are substantially perpendicular to one another. For some embodiments, D2 is also substantially perpendicular to the inner surface of the layout which has the female locking element extruded in it; and in other embodiments, D2 is substantially parallel to the inner surface of the layout.

In alternate embodiments of the invention, the inner and outer layouts are interlocked with each other, or with themselves, to assemble the box. In yet another embodiment of the invention, two identical side layouts interlock with the outer layout to form a box. Another embodiment of the invention comprises a single layout, having complementary, inter-engageable locking elements extruded as a part thereof.

In alternate embodiments of the invention, the inner and outer layouts are solid or hollow. Hollow layouts of the same weight as solid layouts exhibit higher levels of strength and stability.

Different types of hollow layouts may be used in alternate embodiments of the invention, including corrugated plastic sheeting, plastic sheeting with closed air cells, and honeycomb sheeting. Corrugated layouts are advantageous as they are extruded at relatively high speeds using special extrusion dies. Closed air cells offer the advantage of being easily cleansed. Honeycomb sheets provide the best weight to strength, and weight to stability ratios; they can also be relatively easily cleansed.

All layouts of all embodiments of the invention are readily produced on the same production line. When switching from producing one layout, or one size of three-dimensional enclosure, to another, the required readjustments of the production line are minimal: the extrusion die has to be changed, and some cutting and creasing units readjusted.

First Embodiment (FIGS. 1 to 3E)

Nine different embodiments of the invented three-dimensional enclosure are used to illustrate the invention. In the drawings, the first digit in a three-digit number assigned to a design feature represents the embodiment. Thus, 142 is a flexing element in the form of a flexing lip of the female locking element in the outer layout of the first embodiment of the invented three-dimensional enclosure, whereas 742 is a flexing element in the form of a flexing lip of the female locking element of the outer layout of the seventh embodiment of the invented three-dimensional enclosure. The tenth embodiment of this invention (see FIGS. 20A to 20E), separate design features of which are marked by four-digit numbers, is an intermediate design bridging the gap between a more traditional box design and the invented three-dimensional enclosure.

FIG. 1 is an isometric view of the three-dimensional enclosure, according to a first preferred embodiment of the invention 10. The three-dimensional enclosure is formed of an outer layout 11 and an inner layout 12. The inner layout is placed onto the outer layout at a 90° angle. The layouts are then joined together to form the first preferred embodiment of the three-dimensional enclosure.

A top view of the outer layout according to the first embodiment of the invention is shown in FIG. 2A. Creases 120 are formed in the layout to enhance bending. The creases are formed on the borderlines between the areas of the outer layout that will become the flat side members of a box, such as the bottom 104 and the two side walls 105, and the optional larger and smaller parts of the lid, marked correspondingly as 106 and 107. The direction of extrusion is marked by arrow D1.

The female locking elements 140 of the outer layout 11 are grooves 141 with interlocking lips 142 in the outer layout, and protruding above the inner surface of the outer layout. In this particular design of complimentary locking elements, the interlocking lip 142 acts as the aforementioned arresting element (arresting a flexing element of its complementary male locking element at a predetermined depth of insertion). The grooves 141 are extruded in the outer layouts in the direction of extrusion marked by the first arrow D1 in FIG. 2A.

One embodiment of a crease is shown in the front view of the outer layout of FIG. 2C. Its enlarged, detailed view is in FIG. 2E. These creases help to make 90° bends in these regions without subjecting the outer surface 101 of the outer layout to undue elongation. Depending upon the thickness, thermoplastic composition and the wall design of the outer layout, the 90° bends can be assisted with one, two or even more creases.

Locking elements 140 are formed on, and perpendicular to, the inner surface 102 of the outer layout. FIG. 2B is a side view of the outer layout, according to the first preferred embodiment of the invention. In this preferred embodiment, the locking elements are female elements, shown in an enlarged view in FIG. 2D. The direction of insertion is marked by arrow D2.

In the first preferred embodiment of the invention, female locking elements which are made in the form of grooves are extruded into, and located in a proximity to first parallel edges 103A of the outer layout; the pair of parallel edges is oriented in the direction of extrusion, marked by arrow D1. The pair of parallel edges is later referred to as "first pair of parallel edges". Hereinafter, when it mentioned that the locking elements are made on edges it is meant that they may be formed either on the edges themselves or in a close proximity to them. The second pair of parallel edges is marked by 103B, later referred to as "second pair of parallel edges", is transverse with the aforementioned pair of parallel edges 103A.

In this embodiment of the invention, the female locking elements are grooves 141 with interlocking lips 142 in the outer layout, and protruding above the inner surface of the outer layout. In this particular design of complimentary locking elements, the interlocking lip 142, although it may have some flexibility, acts as the aforementioned arresting element (arresting a flexing element of its complementary male locking element or a projection at a predetermined depth of insertion). The grooves 141 are extruded in the outer layouts extending in the direction of extrusion marked by the first arrow D1 in FIG. 2A.

FIG. 3A is a top view of the inner layout 12 according to the first embodiment of the invention. The inner layout is placed on the inner surface of the outer layout 101 for subsequent assembly into the box of the invention. A side view of the inner layout according to this embodiment of the invention is shown in FIG. 3B. The direction of extrusion is marked by arrow D1.

The male locking elements 150 are extruded into the outer edges of the inner layout. The male locking elements 150, shown in FIG. 3B, and in an enlarged view in FIG. 3D, have flexible elements in the form of half-arrow-like wedges 151. In this particular design of complementary locking elements, the half-arrow-like interlocking wedge 151 at the end of a projection acts as the flexing element. The direction of insertion is marked by arrow D2. When a large number of such inner layouts are stacked up one upon another for transportation, these interlocking wedges are flexed back under the weight of the load of packaging and do not protrude beyond the outer surfaces of the inner layouts 112. In alternate embodiments of the invention, any locking element that is adapted for complementary, releasable engagement with the locking elements on the outer layout is used.

Creases 130 are provided in the inner side of the inner layout 12 to enhance the bending of the inner layout to form the inner bottom 114 and inner side walls 115 of the box. In alternate embodiments of the invention, various cuts are made in the inner layout, such as the two side cuts 116 shown in FIG. 3A. These side cuts facilitate the interlocking of the male locking elements of the side walls of the inner layout and the respective female locking elements of the side walls of the outer layout. All four corners of the inner layout are cut 117 to make space for the bending region(s) between the lid and the side wall(s) of the outer layout.

The two cuts 116 and the four corner cuts 117 are the only pieces of sheet material from the outer layout 11 and the inner layout 12 which are scrapped. Thus, the percentage of scrap is extremely low for the first embodiment of the invented three-dimensional enclosure. As in becomes obvious later, the other embodiments have even less scrap.

Assembly of this embodiment of the invention requires the inner layout to be bent 90°. However, the inward-protruding locking elements of the outer layout in its bottom section interfere with this bending. Therefore, the 90° bending is done in two separate portions to bypass the protruding locking element. Two creases are shown for each 90° bend in the front view of the inner layout of FIG. 3C. An enlarged view of a crease 130 is shown in FIG. 3E.

In those portions of the outer layout 11 which belong to the larger part of the lid 106 and to the smaller part of the lid 107 (see FIG. 2A), the female locking elements 140 perform a not the arresting but retaining duty. When the lid or any of its parts is closed, the upper edges 113D of the inner layout 12 get inserted into the corresponding portions of the female locking elements 140. Instead of arresting the so formed joints between the lid and the upper edges 113D of the inner layout 12, the lip 142 provides retention pressure between the adjoining surfaces of the female locking elements 140 and the inserted sides of the inner layout 12. The resulting friction keeps the lid closed. If the friction alone is not sufficient to keep the lid closed, additional retention grooves can be made in the appropriate places of the outer surface 112 of the inner layout 12. (That kind of optional retention grooves are discussed later, see 291 in FIG. 6G and 391 in FIG. 10E.)

Male locking elements are located along the edges 113C of the inner layout 12. The pair of parallel edges 113C is oriented in the direction of extrusion, marked by arrow D1. The pair of parallel edges is also later referred to as "first pair of parallel edges". The second d pair of parallel edges is marked by 103D, later referred to as "second pair of parallel edges", is transverse with the aforementioned pair of parallel edges 113C.

Second Embodiment (FIGS. 4 to 8D)

Figure 4:
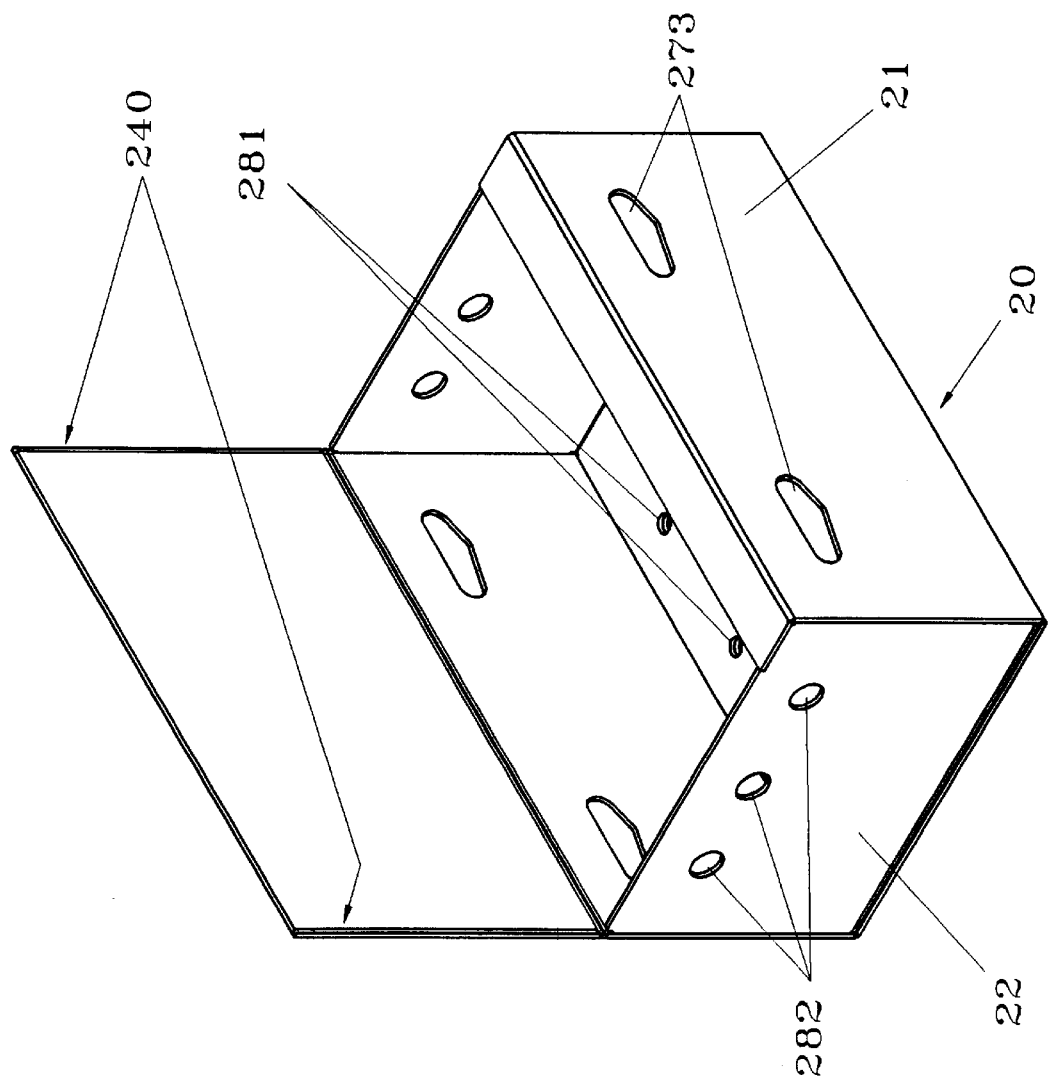
FIG. 4 is an isometric view of an invented enclosure, according to a second, equally preferred embodiment of the of the invention.

FIG. 4 is an isometric view of an invented box according to a second, equally preferred embodiment 20 of the invention. As in the first preferred embodiment of the invention, the lid is an integral part of the outer layout 21. The second embodiment of the invention differs from the first embodiment in several respects. The female locking elements 240 are fully hidden in the thickness of the outer layout, as is shown in FIGS. 5A, 5B and 5D. The female locking elements 240 are flush with the inner surface of the outer layout 201. Therefore, there is no need to bend the inner layout in two stages, as it is done in the first embodiment.

The inner and outer layouts 21, 22 of this second embodiment are solid. In both the first and the second embodiments of the invention, the width of each of the layouts for a given three-dimensional enclosure corresponds with either one or another of the two dimensions of the bottom. The direction of extrusion is marked by arrow D1.

Six holes 282, three in each side wall, are formed in the inner layout of this embodiment to facilitate its disassembly. Both the outer layout 21 and the inner layout 22 have holes for drainage in their bottoms 271, 281. In this second preferred embodiment of the invention, elongated holes 273 are formed through the outer layout to provide handles for the box. It is apparent to one skilled in the art that different amounts of holes may be provided for various purposes in alternate embodiments of the invention.

A top view of the outer layout 21 according to the second embodiment of the invention is shown in FIG. 5A. Creases 220 are formed in the layout to enhance bending. The creases are formed on the borderlines between the areas of the outer layout that will become the bottom 204 and the two side walls 205, as well as on the border regions between the side walls 205 and the larger 206 and smaller parts of the lid 207. An enlarged, detailed view of creases 220 is shown in FIG. 5G.

FIG. 5C is a front view of the outer layout, according to the second, equally preferred embodiment of the invention. The creases 220 help to make 90° bends without subjecting the outer surface 202 of the outer layout to undue elongation. Depending upon the thickness, thermoplastic composition and the wall design of the outer layout, the 90° bends can be assisted with one crease, two creases (as shown in FIGS. 5C and 5G), or even more creases.

Enlarged side views of an locking element 240 of the outer layout of this embodiment is shown in FIG. 5D. The direction of insertion is marked by arrow D2. The locking elements of this embodiment are two mirror-image female locking elements situated along the outer edges 203A of the outside layout. Each of these locking elements consists of a nearly rectangular cavity 241 made into the inner surface 201 of the outer layout, and an interlocking lip 242.

The pair of parallel edges 203A is oriented in the direction of extrusion, marked by arrow D1. The pair of parallel edges is later referred to as "first pair of parallel edges". The second pair of parallel edges is marked by 203B, later referred to as "second pair of parallel edges", is transverse with the aforementioned pair of parallel edges 203A.

A top view of the inner layout 22 according to the second embodiment of the invention is shown in FIG. 6A. Creases 230 are formed in the inside surface 211 of the inside layout to enhance bending. The creases for bending the layout at 90° are formed on the borderlines between the areas of the outer layout that will become the bottom 214 and the two side walls 215. An enlarged view of a crease 230 is shown in FIG. 6E.

Interlocking male elements 250 are formed into the outer edges 213C of the inner layout. FIG. 6B is a side view of the inner layout, according to the second, equally preferred embodiment of the invention. An enlarged view of an interlocking male element 250 is shown in FIG. 6D. In this preferred embodiment, the locking elements are male elements of a certain shape wherein the retention of the interlocked layouts is secured by an interlocking groove 251 along the outer edges 213C of the outer surface 212 of the inner layout. The direction of insertion is marked by arrow D2 (see FIG. 6D).

Male locking elements are located along the edges 213C of the inner layout 22. The pair of parallel edges 213C is oriented in the direction of extrusion, marked by arrow D1. The pair of parallel edges is also later referred to as "first pair of parallel edges". The second pair of parallel edges is marked by 213D, later referred to as "second pair of parallel edges", is transverse with the aforementioned pair of parallel edges 213C.

In this particular design of complementary locking elements, the interlocking groove 251, being a part of the male locking element 250, acts as an arresting element, and the interlocking lip 242, being a part of the female locking element 240, acts as a flexing element. In the previously discussed first embodiment, the flexing element (151) were parts of the male locking elements 150, and the arresting elements (142) were parts of the female locking elements 140. In alternate embodiments of the invention, any appropriately matching pair of locking elements may be used.

Once any part of the lid is closed, the lip 242 of the lid is retained in the closed position by a lid retention groove 291 in the outer surface. The lip enters into this lid retention groove, which is located on the inner layout close and parallel to the edge 218. One of the embodiments of such lid retention groove is shown in the front view of the inner layout, according to the second, equally preferred embodiment of the invention, shown in FIG. 6C. An enlarged view of retention groove 291 is shown in FIG. 6G. The force needed to open the lid of a closed three-dimensional enclosure, according to this second, preferred embodiment, is controlled by factors including the depth and the slope of the retention groove for a given female locking element of the inner layout.

In the second preferred embodiment of the invention, drainage holes 271 are formed through the outer layout, and positioned to coincide with drainage holes 281 formed in the inner layout. Similarly, elongated holes are formed through the outer layout 21 to provide handles 273 for the box. In alternate embodiments of the invention, the three-dimensional enclosure is formed without drainage holes, or without handles.

In order that the inner layout can be placed inside the outer layout and then interlocked with it, cuts 216 are made in the sides of the inner layout, as shown in FIG. 6A. Additionally, all four outside corners are cut 217.

FIG. 7A illustrates the first step of a method for assembling the three-dimensional enclosure of the second preferred embodiment of the invention, FIG. 7B the second and third steps, FIG. 8A the fourth step, and FIG. 8B the fifth step of the method of assembly. Here is how this method of assembly works. Both sides of the outer layout 41 are first folded up to 70°. Both sides of the inner layout 43 are then folded 90°. The folded inner layout 43 is rotated 90° (see A in FIG. 7B) and then placed inside the folded outer 41 layout so that the bottom portions of both layouts coincide. Both layouts must be positioned in such a way that the outside of the inner layout 212 is on top of the inside of the outer layout 201 in proper orientation, and both side walls 215 of the inner layout bent at 90° to its bottom 214. The corresponding male locking elements of the inner layout 250 are then forced into the corresponding female locking elements of the outer layout 240 (see FIG. 8A and FIG. 8C) and snapped into locked position (see FIG. 8B). In the process, the locking elements of the inner and outer layouts are snapped together as shown in an enlarged sectional view 8D, and a part of the lid may be closed, as shown in FIGS. 8B and 8G.

To disassemble an empty three-dimensional enclosure, the lid is opened, the two outer edges of the bottom of the outer layout are held in position, and the inner layout is slid out of the outer layout. The sideholes 282 on both sides of the inner layout are adapted to facilitate holding the inner layout to lift it upwards, thereby disengaging the locking elements.

Figure 9:
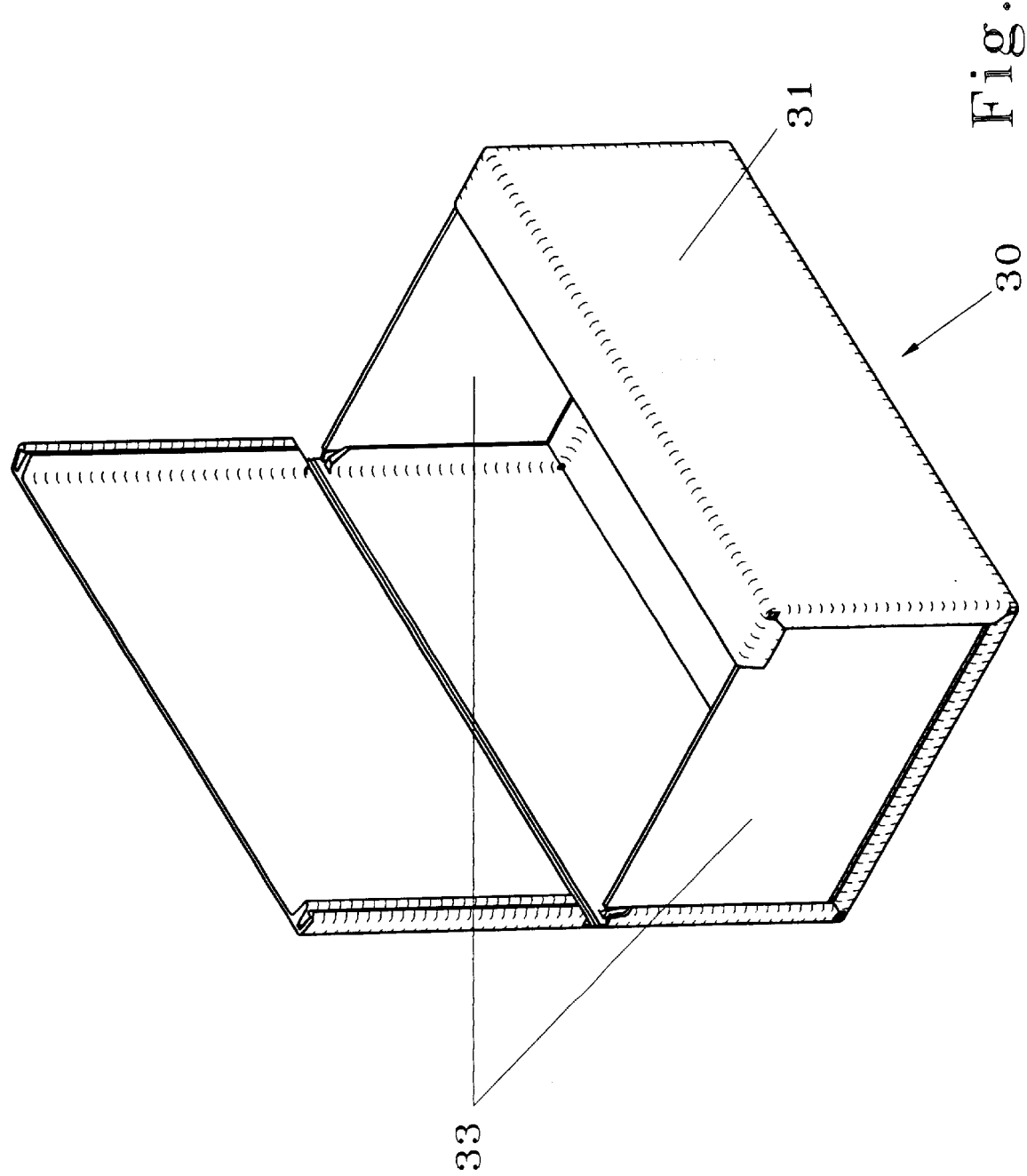
FIG. 9 is an isometric view of an invented enclosure, according to a third, equally preferred embodiment of the invention.

Third Embodiment (FIGS. 9 to 10E)

FIG. 9 is an isometric view of an invented box according to the third, equally preferred embodiment of the invention 30. This embodiment differs from the previous two embodiments in that its inner layout is no longer in one piece, but has two identical side pieces 33. The outside layout 31 has the same features as the previously discussed three-dimensional enclosure embodiments. In this particular embodiment of three-dimensional enclosure with two side pieces, the female locking elements of the outer layout protrude outside of their inner surface.

FIG. 10A shows the top view of one of the identical side pieces 33. The side view of the side piece is shown in FIG. 10B. An enlarged view of a male locking element 350 is shown in FIG. 10D. As have the inner layouts of the previously discussed embodiments of this invention, the side piece has two mirror-image locking elements 350 at its outer edges. Once the locking elements of the side pieces are interlocked with the corresponding locking elements of the outer layout, the interlocking lips of the female locking elements of the outer layout enter into the interlocking grooves 351 of the side pieces to prevent their accidentally coming apart. They are disengaged by sliding the side pieces out of the outer layout.

As in the above discussed embodiments, the interlocking grooves 351 are extruded or otherwise formed into the outer surface 312 of the side pieces. As in the above discussed embodiments, the corners of the side pieces have to be cut to make room for folding the outer layout. The cuts of this particular embodiment 317 are made under 45°; other embodiments can have differently shaped corner cuts.

As in the second three-dimensional enclosure embodiment, the closed lid is kept from opening by the interaction of the retention lip of the female locking element of the lid with the retention grooves of the side pieces. One of the embodiments of such a lid retention groove is shown in the front view of the side piece of FIG. 10C, and its enlargement in FIG. 10E. By choosing the depth and the slope of the retention groove 391 for a given female locking element of the inner layout, we can choose the force needed to open the lid. However, unlike the previously discussed three-dimensional enclosure embodiment, a similar retention groove 391 will interact with the locking element in the bottom portion of the outer layout keeping the side piece in place within the limits of some specified retention force.

In order to disassemble an invented box of the third preferred embodiment, the lid is opened and each of the side pieces 33 is slid out of engagement. In doing so, the friction between the interlocking lips of the outer layout along the interlocking grooves 351 of the side piece, and the retention force between the lip on the bottom portion of the outer layout and the retention groove 391 along the bottom portion of the side piece 33 must be overcome.

It is apparent to one skilled in the art that the retention force between the bottom portion of the outer layout and the bottom portion of the side piece can be varied by choosing different shape and depth retention grooves for the bottom portion of the side piece. In the third preferred embodiment, the retention forces for a closed lid and for the bottom engagement of the side piece are made the same by making both retention grooves alike. In other embodiments, these retention grooves in the side pieces are different.

Fourth, Fifth and Sixth Embodiments (FIGS. 11 to 14)

FIG. 11 is an isometric view of the fourth, equally preferred embodiment 40. This embodiment differs from the third embodiment in that the female locking elements of the outer layout 41 do not protrude outside the inner surface of the outer layout. In alternate embodiments of the invention, the outer layout of this embodiment resembles that of the second embodiment, and its side pieces 43 resemble those of the third embodiment.

FIG. 12 is an isometric view of a fifth equally preferred embodiment 50 of the invention, in which the lid is made as a separate piece 54. In all its extruded aspects the lid is identical to the outer layout.

Figure 13:
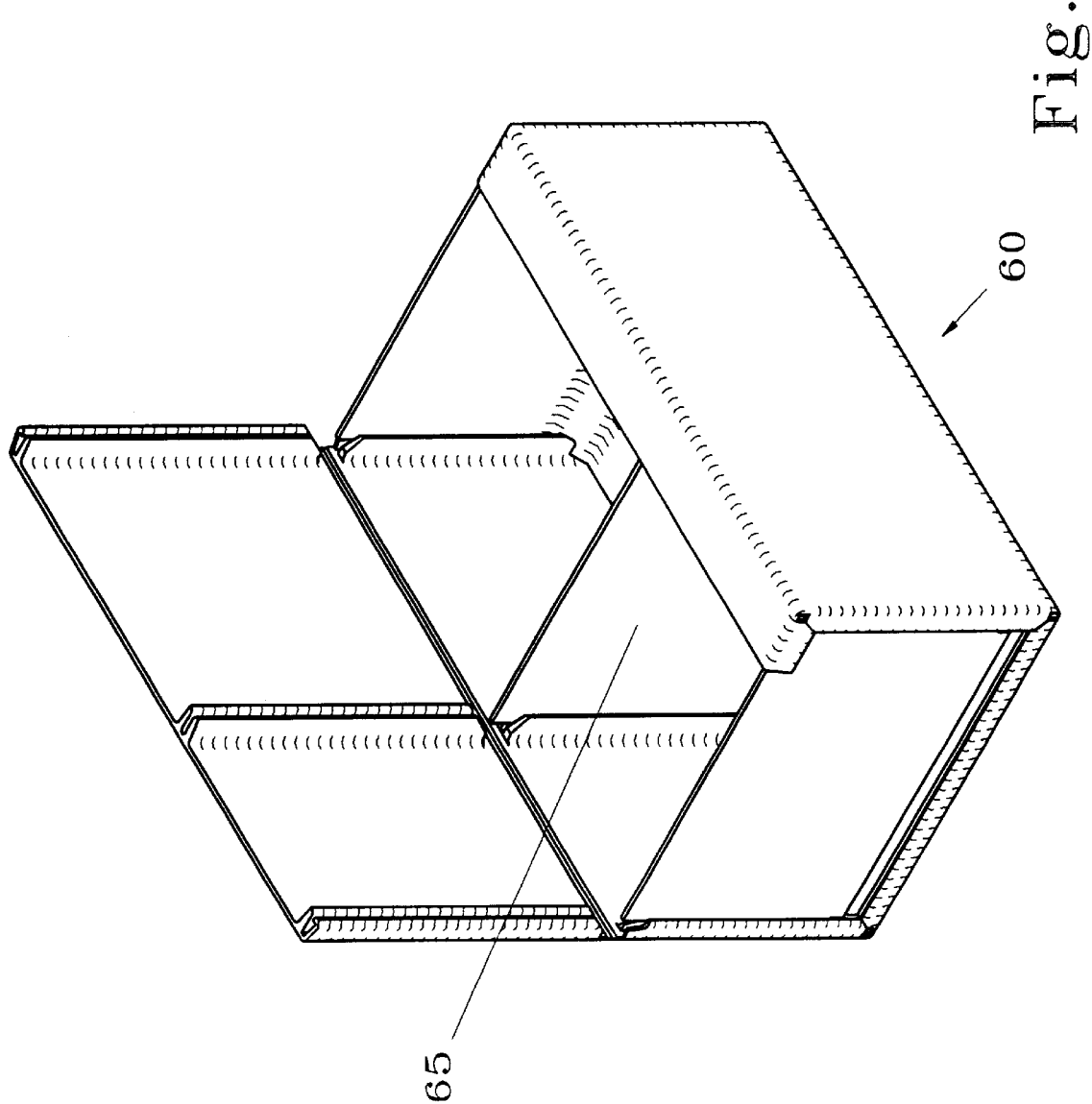
FIG. 13 is an isometric view of the partitioned three-dimensional enclosure, according to the sixth embodiment, equally preferred embodiment of the invention.

FIG. 13 is an isometric view of the partitioned three-dimensional enclosure 60 according to the sixth embodiment of the invention. In this particular embodiment, the separation of the interior space defined by the box is obtained by removably joining a partition 65 within the interior space of the three-dimensional enclosure to at least one extruded female locking element. The female locking elements may be located on either, or both, of the inner and outer layouts.

Figure 14:
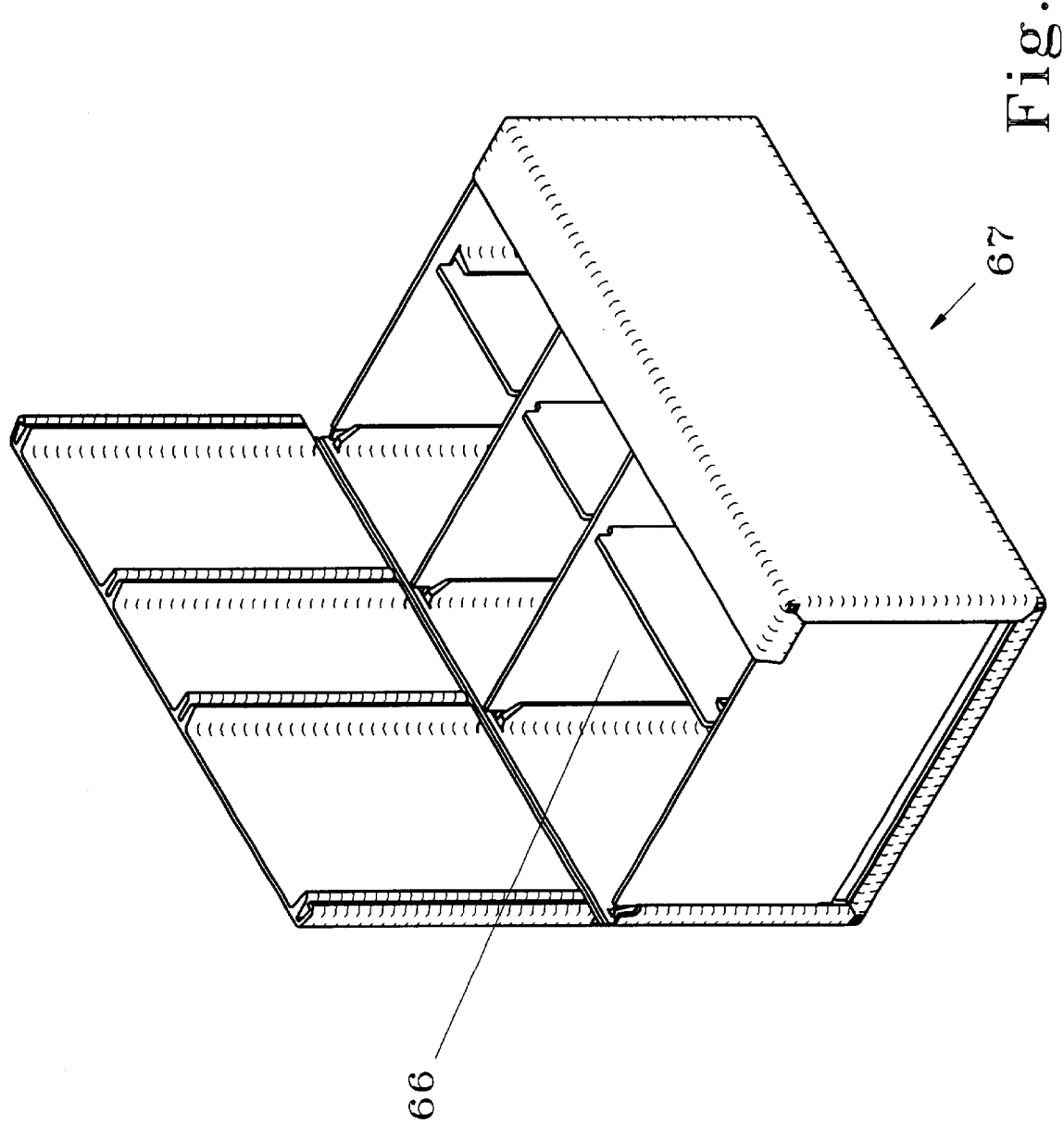
FIG. 14 is an isometric view of the multiple-partitioned three-dimensional enclosure of the sixth, equally preferred embodiment of the invention.

FIG. 14 shows an isometric view of the sixth embodiment of the invention 67 having multiple partitions 66. It is apparent to one skilled in the art that partitions can be held in place not only by special matching locking elements in the outer or inner layouts, but by the product stored in the three-dimensional enclosure, or by making partitions in such a way that they themselves remain in the required position.

Seventh Embodiment (FIGS. 15A to 17E)

Figures 15A, 15B:
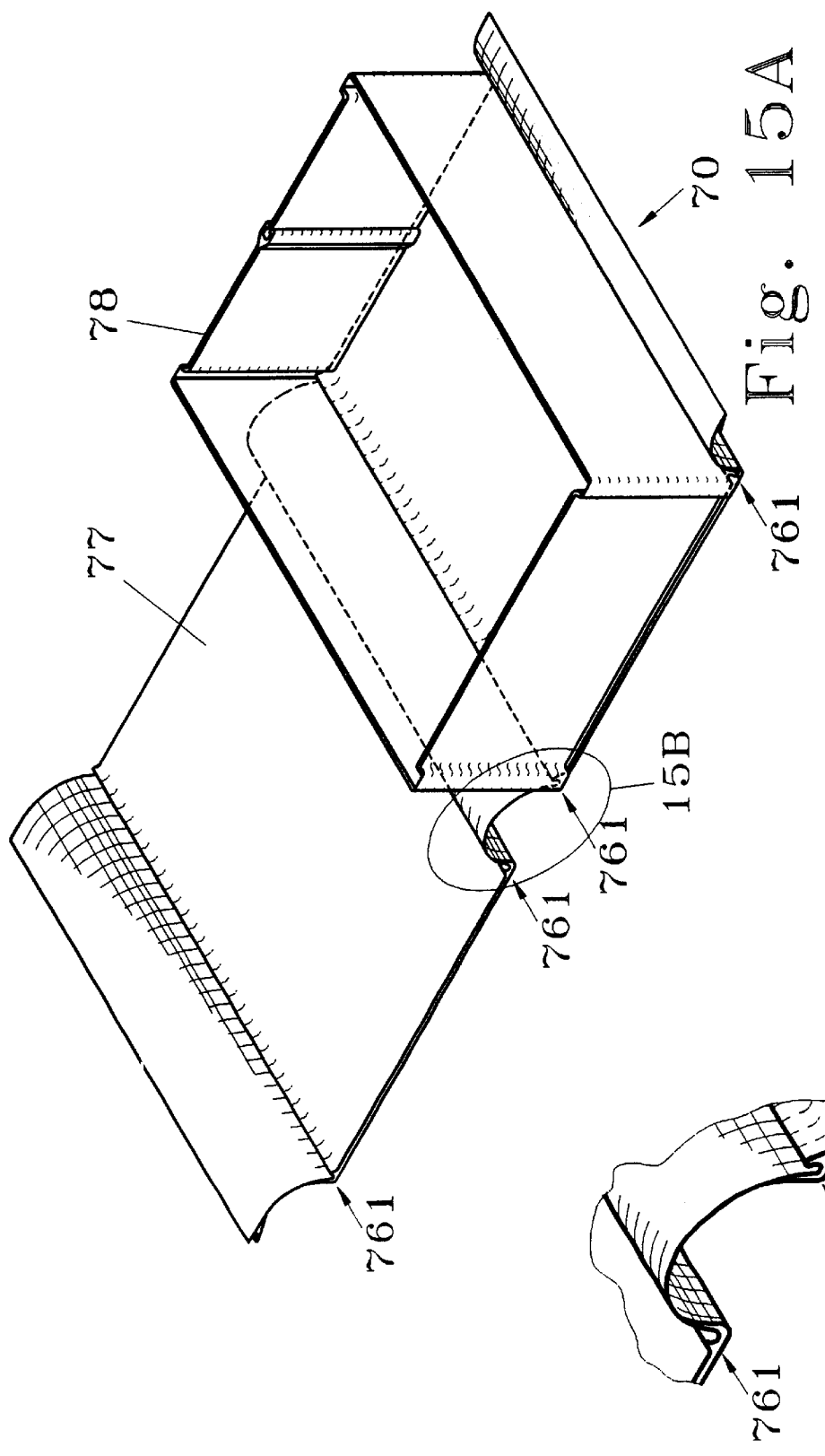
FIG. 15A is an isometric view of an invented enclosure, according to the seventh, equally preferred embodiment of the invention.
FIG. 15B is an enlarged, detailed view of a selected area in FIG. 15A.

FIG. 15A is an isometric view of a seventh equally preferred embodiment 70 of the three-dimensional enclosure of the invention, and FIG. 15B is an enlarged selected view of a selected area in FIG. 15A. In this embodiment, the outer layout 77, shown in the top view of FIG. 15A, may be interlocked with itself to form an outer box, defining an interior space for the inner layout 78. Four positioning grooves 761 are extruded into the inner surface 701 of the outer layout for capturing the corresponding outer edges 713 of the inner layout 78 to keep it in place.

The outer layout 78, shown in the top view of FIG. 16A, is locked with itself to form an inner box defining an interior space, as is shown in the side view of FIG. 16B in phantom line (line-dot-dot). In this embodiment, all the corner regions and bending areas, all the wall thicknesses in cross-sections across the length of the layouts, and all the locking and locking elements of both layouts are shaped by corresponding extrusion dies.

An enlarged view on a flexible side member 780 and the adjacent with it two positioning grooves 761 is shown in FIG. 16D. The positioning grooves 761 are parts of the rigid side members of the outer layout 77; these two rigid side members are interconnected by the flexible side member 780 to ease the wrapping of the outer layout 77 around a complimentary inner layout 78, so that the corresponding edges of the inner layout 78 are caught and tightly held in the positioning grooves 761, so that the rigid side members of the inner layout reinforce the rigidity of the three-dimensional enclosure, while the flexible side members of the outer layout are contributing to the positioning of the inner layout.

Enlarged views on the locking elements 740 and 750 are given in FIGS. 16E and 16C, respectively. These views show that there are two more flexible bending areas in the outer layout 77 of this embodiment.

FIG. 17A is a top view of the inner layout. In alternate embodiments of the invention, all locking elements are of different design as long as the corresponding locking elements are in compliance with one another. In the seventh embodiment, the male and female interlocks 760, 770 for joining two ends of the inner layout 78 have rounded shapes (see FIGS. 17B, 17D and 17C). The primary locking elements 740 and 750 for interlocking the ends on the outer layout 77 when closing the three-dimensional enclosure have an arrow-like design. It will be appreciated by one skilled in the art that different numbers of positioning grooves may be used. For instance, positioning grooves may be in only one of the rigid side members of the outer layout. If no positioning grooves 761 are used, the three-dimensional enclosure can have a slidably removable inner box, like a matchbox.

The primary purpose of these positioning grooves 761 is to position the inner layout and keep it in place during the loading of the box with a product. The secondary purpose of the positioning grooves is to reinforce the outer layout's flexible side members and add stability to the three-dimensional enclosure.

One of the advantages of the seventh preferred embodiment of the invention is that, since both layouts are cut out perpendicular to the direction of extrusion, no additional operation is needed for creasing the layouts. The designated corner areas 790 of the inner layout 78 are extruded into the layouts, see FIGS. 17B and 17E. Furthermore, the extrusion process is readily adapted to forming different shapes and thicknesses of the layouts.

The inner layout and the outer layout of this three-dimensional enclosure embodiment can have similar design locking elements. However, the larger the ratio of the length of an inner layout, and the less rigid the layout is to twisting, the easier it becomes to open the lock of the inner layout by simply sliding the male locking element 760 sideways out of the female locking element 770.

FIG. 16D and FIG. 17E show how areas for bending are designed into the extruded layouts of the seventh embodiment. Thus, areas 780 and 790 are designed having in mind both the economical use of the material and the desired ease of bending the outer and the inner layouts, respectively.

FIG. 16F is a side view of the prying tool 79 of the invention. The prying tool is adapted for use with the arrow-like design of the outer layout locks with a specially shaped, protruding locking lip of the seventh preferred embodiment of the invention. The interlocked elements 740 and 750 on the outer layout are pried open by sliding such a tool under the protruding lip of the female locking element 740.

It is readily apparent that the female locking element of an outer layout can be designed in such a way that its outer lip can be opened without a special tool. For example, the outer layout can have a combination of an opening lever and fulcrum already extruded as a flexibly attached extension to its outer lip.

FIG. 17B illustrates a sequence of assembling the inner layout 78. The steps are numbered as I, II, III, and IV, and the assembled inner layout is shown in phantom line (line-dot-dot).

Eighth and Ninth Embodiments (FIGS. 18A to 19B)

Figure 18A:
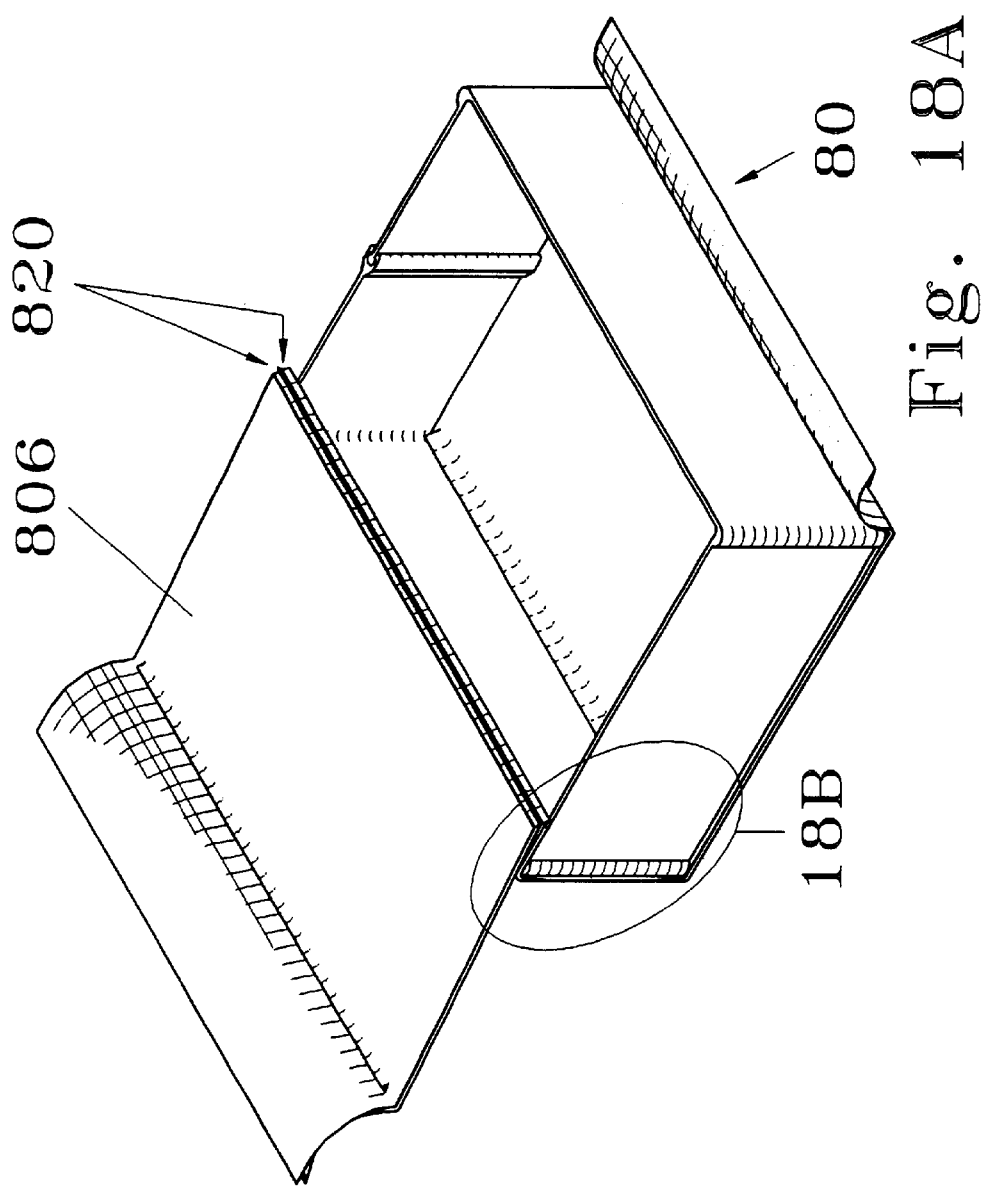
FIG. 18A is an isometric view of an invented enclosure according to a eighth, equally preferred embodiment of the invention.
Figure 18B:
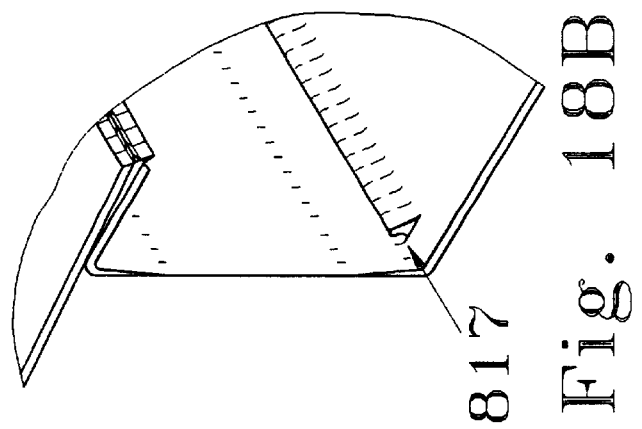
FIG. 18B is a detailed view of a selected area in FIG. 18A.

FIG. 18A is an isometric view of a eighth equally preferred embodiment 80 of the three-dimensional enclosure of the invention. FIG. 18B is an enlarged view of a selected area in FIG. 18A. This embodiment differs from the seventh embodiment in two respects. First, both ends of the positioning grooves (adapted for positioning and even some retention of the inner layout) are notched off 817, so that the corners of the inner layout no longer need to protrude outside of the outer layout, thereby simplifying the design of the inner layout. Second, a crease 820, or a set of creases, is extruded into the lid portion 806 of the outer layout, so that the lid can be partially opened.

Figure 19A:
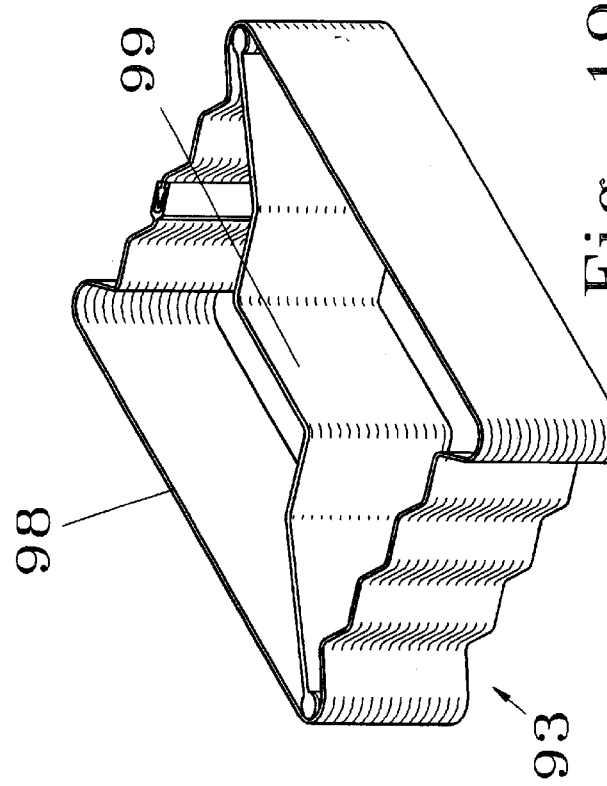
FIG. 19A is an isometric view of an invented enclosure, according to the ninth embodiment of the invention.
Figure 19B:
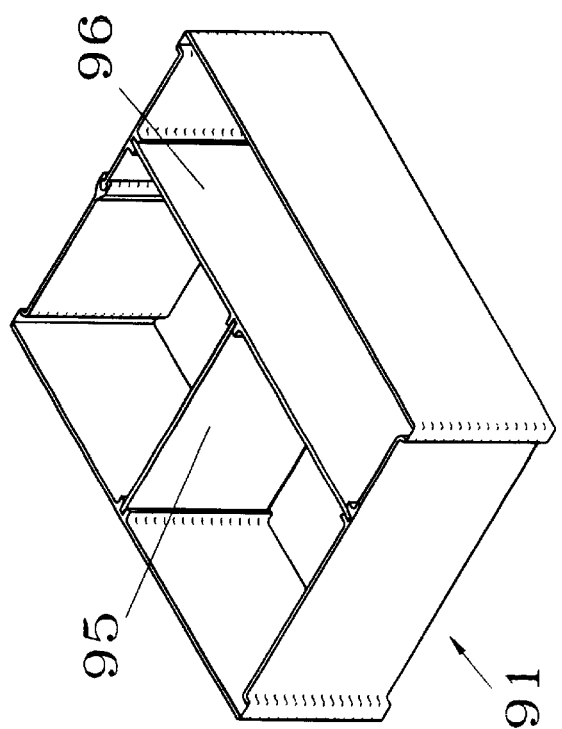
FIG. 19B is an isometric view of an invented enclosure, according to the ninth embodiment of the invention.

FIG. 19A and FIG. 19B are isometric views, respectively, of the inside layouts of two variations of the ninth preferred embodiment of the invention 93 and 91. Only these Invented boxes are actually shown. These variations have various partitions to divide the inner space of the box into compartments. The variation of FIG. 19B shows interlocked partitions 95, 96. The embodiment of FIG. 19A has an inner layout with two corrugated sides 98 to increase the stability and the load-carrying capacity of the three-dimensional enclosure, as well as a non-straight partition 99. In alternate embodiments of the invention, the partitions have different shapes, including straight, curved and angled configurations.

Transitional Design (FIGS. 20A to 20E)

FIGS. 20A and 20B are top and front views, respectively, of a single layout three-dimensional enclosure, according to the tenth embodiment of the invention 1010. FIGS. 20C, 20D and 20E are enlarged views of selected areas in FIG. 20B. The direction of extrusion is marked by arrow D1 (FIG. 20A), and the direction of insertion by arrow D1 (FIGS. 20C and 20E).

In this embodiment, a male locking element 1050, having interlocking groove 1051, is extruded into one edge of the single layout. A complementary female locking element 1040, having an interlocking lip 1042 adapted for releasable inter-engagement with the male locking element, is extruded into the opposite edge of the layout. Creases 1020 facilitate the folding of the layout to form the box.

When the invented boxes are no longer needed, or they are worn out beyond their usefulness, these boxes can easily be ground up and the grinds used as raw material for the next boxes. Recycling of the boxes of this invention is a much simpler and easier process than recycling corrugated paperboard boxes.

Summary, Ramifications, and Scope

Thus it has been shown that the invention provides a collapsible, three-dimensional enclosure with at least five side surfaces made from extruded inexpensive plastic material which is reusable; has a simple and versatile design so that the same design can be used for a wide variety of standardized general purpose shipping boxes; uses advantageously the direction of extrusion for maximum strength of the enclosure so that there is no need for reinforcing overlaps; has no additional corner pieces, overlapping retention flaps or other added interlocking means beyond those which are contained in the side members of the three-dimensional enclosure itself; can be easily assembled by interlocking mutually complementary locking elements in or near the edges of the layouts; can be easily disassembled by sliding the layouts apart side-ways so that there is no need to overcome the retention capacity of interlocked elements; retains its initial irreversible locking capacity in the direction relevant to the functional integrity of the enclosure after each disassembly; is easy and inexpensive to manufacture, is suitable for in-line mass production, and can be produced practically without any production wastes; and is superior to the currently used corrugated paperboard shipping boxes.

Although the invention is described herein with reference to nine preferred embodiments, one skilled in the art will readily appreciate that other applications may be substituted for those set forth herein without departing from the spirit and scope of the invention. For example, the size, thickness and the design of a sheet's cross-section (e.g., being a solid sheet, corrugated sheet, honeycomb-type sheet, a sheet with closed air cells, or otherwise non-solid sheet); the layouts can be varied to accommodate the particular storage and strength requirements of various boxes. When creases are formed in both surfaces of a layout, or when special notches or other projections are formed (e.g., extruded) into a layout, three-dimensional enclosures can become a part of larger structures. Several three-dimensional enclosures of this invention can be fastened by various means used in this invention, such as additional layouts wrapped around several separate enclosures and interlocked onto itself. Three-dimensional enclosures of this invention can be interlockable when mutually complementary locking elements are extruded in the outer sides of their respective layouts.

Everything said here about extrusion is equally valid for coextrusion. For instance, layouts can be coextruded with thin outside and inside layers of other materials to provide different colors, textures or barrier layers. These coextruded layers can be from 5 $\mu$m to hundreds of micrometers thick.

Therefore any other modification and variation is possible, provided they are within the scope of the claims of the present invention.

We claim:

1. A collapsible three-dimensional enclosure, comprising: at least one first layout that contains at least one side member; at least one second layout that contains at least two side members interconnected through a foldable connection, said first layout and said second layout each having a substantially rectangular configuration defined by a first pair of parallel edges and a second pair of parallel edges which are substantially perpendicular to said first pair of parallel edges; and locking elements formed in proximity to at least one of said first pair of parallel edges and said second pair of parallel edges, said locking elements being selected from the group consisting of a male locking element and a complementary female locking element with a groove extending in a first direction, each said male locking element being insertable into said groove of each of said complementary female locking element in a second direction substantially perpendicular to said first direction with a snapping action which forms a rigid connection irreversible in said second direction but being slidable in said first direction, said grooves each having at least one open end so that said layouts are assemblable to form the enclosure and disassemblable;

said male locking element and said complementary female locking element being made as a one piece with said first layout and said second layout respectively;

when either one of said male locking element and said complementary female locking element being made as a one piece with one of said first layout and said second layout, then the other one of said male locking element and said complementary female locking element being made as a one piece with the other one of said first layout and said second layout; wherein at least two of said side members of at least one of said first layout and said second layout are rigid side members and remaining side members are flexible side members, at least two of said side members of said first layout and said second layout being overlapped with one another and each of said first layout and said second layout having on one of said pair of parallel edges said male locking element and on another of said pair of parallel edges said complementary female locking element so that said first layout and said second layout are lockable onto themselves by engaging said male locking element with said complementary female locking element.

2. The collapsible three-dimensional enclosure of claim 1, wherein in said at least one second layout said rigid side members which are adjacent to said flexible side members and define edges of said enclosure have positioning grooves which are parallel and adjacent to said edges of said enclosure and which receive one of said pairs of parallel edges of said at least one first layout.

3. The collapsible three-dimensional enclosure of claim 1, wherein at least said first layout is composed of a sheet material having a thickness, and said foldable connection being a portion of at least of said first layout that is thinner than said thickness.

4. The collapsible three-dimensional enclosure of claim 1, wherein said rigid connection is formed by said male locking element and said complementary female locking element, at least one of said male locking element and said complementary female locking element having at least one flexible element which has a first dimension in a free state and is deformable to a second dimension, and another of said male locking element and said complementary female locking element having arresting means for irreversibly locking said flexible element substantially in said second dimension when said male locking element is inserted into said female locking element.

5. The collapsible three-dimensional enclosure of claim 1, wherein said first layout and said second layout are composed of an extruded material having a direction of extrusion and wherein said first direction coincides with said direction of extrusion.

6. The collapsible three-dimensional enclosure of claim 1, wherein said first layout and said second layout are made of an extruded material having a direction of extrusion and wherein said first direction coincides with said direction of extrusion.

7. The collapsible three-dimensional enclosure of claim 6, wherein said second layout is an outer layout and said first layout is an inner layout which is at least partially surrounded by said outer layer.

* * * * *